US012707151B2

(12) United States Patent
Jeon et al.

(10) Patent No.: US 12,707,151 B2
(45) Date of Patent: Aug. 11, 2026

(54) ELECTRONIC DEVICE FOR MEASURING EFFECTIVE DYNAMIC RANGE LENGTH AND METHOD OF OPERATING THE ELECTRONIC DEVICE

(71) Applicant: Samsung Electronics Co., Ltd., Suwon-si (KR)

(72) Inventors: Seungwan Jeon, Suwon-si (KR); Eunji Yong, Suwon-si (KR); Dongyoung Song, Suwon-si (KR); Dongoh Kim, Suwon-si (KR); Sungsu Kim, Suwon-si (KR); Yitae Kim, Suwon-si (KR); Kichrl Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 18/827,047

(22) Filed: Sep. 6, 2024

(65) Prior Publication Data

US 2025/0088752 A1 Mar. 13, 2025

(30) Foreign Application Priority Data

Sep. 12, 2023 (KR) ........................ 10-2023-0120927

(51) Int. Cl.
*H04N 23/71* (2023.01)
*H04N 23/741* (2023.01)

(52) U.S. Cl.
CPC ........... *H04N 23/71* (2023.01); *H04N 23/741* (2023.01)

(58) Field of Classification Search
CPC ...... H04N 23/71; H04N 23/741; H04N 25/58; H04N 17/002

(Continued)

(56) References Cited

U.S. PATENT DOCUMENTS 6,825,884 B1 * 11/2004 Horiuchi ................ H04N 23/70 358/521
8,208,748 B2 6/2012 Joon-Ki et al.
(Continued)

FOREIGN PATENT DOCUMENTS

KR 10-2004-0051370 A 6/2004
KR 10-0599133 B1 7/2006
KR 10-2009-0100532 A 9/2009

OTHER PUBLICATIONS

Ce Liu, et al. "Noise Estimation from a Single Image," IEEE Confrence on Computer Vision and Pattern Recognition, pp. 1-9, (2006).

(Continued)

*Primary Examiner* — Yogesh K Aggarwal
(74) *Attorney, Agent, or Firm* — Fish & Richardson P.C.

(57) ABSTRACT

A method of operating an electronic device includes receiving a plurality of reference code values respectively corresponding to a plurality of reference images captured by an image sensor during different exposure times, receiving a plurality of target code values corresponding to a target image captured by the image sensor, estimating an inverse camera response function (CRF) by adjusting a scale of the plurality of reference code values so that the scale of the plurality of reference code values is equal to a scale of the inverse CRF, wherein the inverse CRF estimates radiance corresponding to the plurality of reference code values, generating a radiance map based on the plurality of reference code values and the inverse CRF, and measuring an effective dynamic range (DR) length of the image sensor based on the radiance map and the plurality of target code values.

20 Claims, 23 Drawing Sheets

(58) Field of Classification Search
USPC ........................................... 348/222.1–229.1
See application file for complete search history.

(56) References Cited

U.S. PATENT DOCUMENTS

| | | | | |
|---|---|---|---|---|
| 8,391,632 | B2 | 3/2013 | Oakley | |
| 8,798,395 | B2 | 8/2014 | Jo | |
| 8,953,882 | B2 | 2/2015 | Lim et al. | |
| 10,645,304 | B2 * | 5/2020 | Urfalioglu | H04N 23/667 |
| 11,050,946 | B2 | 6/2021 | Douady et al. | |
| 11,463,630 | B2 | 10/2022 | Rivard et al. | |
| 2004/0114055 | A1 | 6/2004 | Yu | |
| 2005/0271298 | A1 | 12/2005 | Yu | |
| 2016/0284065 | A1 | 9/2016 | Cohen | |
| 2017/0310981 | A1 * | 10/2017 | Agostinelli | H04N 19/117 |
| 2019/0043184 | A1 | 2/2019 | Bovik et al. | |

OTHER PUBLICATIONS

P.E. Debevec, "Recovering High Dynamic Range Radiance Maps from Photographs," SIGGRAPH '97: Proceedings of the 24th annual confrence on Computer grapghics and interactive techniques; pp. 369-378 (1997).

S.C. Tai, et al. "A Fast Method for Image Noise Estimation Using Laplacian Operator and Adaptive Edge Detection," ISCCSP, Malta, pp. 1077-1081 (2008).

"Dynamic Range." Imatest (<https://www.imatest.com/solutions/dynamic-range/>) (Date is prior to Sep. 12, 2023.).

P.E. Debevec, "Recovering High Dynamic Range Radiance Maps from Photographs," SIGGRAPH '97: Proceedings of the 24th annual confrence on Computer graphics and interactive techniques; pp. 369-378 (1997).

"Dynamic Range." Imatest (<https://www.imatest.com/solutions/dynamic-range/>), Date is before Sep. 2023.

* cited by examiner

| | C1 | C2 | C3 | C4 | C5 | C6 | C7 |
|---|---|---|---|---|---|---|---|
| R1 | CV_11 | CV_12 | CV_13 | CV_14 | CV_15 | CV_16 | CV_17 |
| R2 | CV_21 | CV_22 | CV_23 | CV_24 | CV_25 | CV_26 | CV_27 |
| R3 | CV_31 | CV_32 | CV_33 | CV_34 | CV_35 | CV_36 | CV_37 |
| R4 | CV_41 | CV_42 | CV_43 | CV_44 | CV_45 | CV_46 | CV_47 |
| R5 | CV_51 | CV_52 | CV_53 | CV_54 | CV_55 | CV_56 | CV_57 |
| R6 | CV_61 | CV_62 | CV_63 | CV_64 | CV_65 | CV_66 | CV_67 |
| R7 | CV_71 | CV_72 | CV_73 | CV_74 | CV_75 | CV_76 | CV_77 |

70a

| | | |
|---|---|---|
| $\frac{2}{36}$ | $\frac{3}{36}$ | $\frac{2}{36}$ |
| $\frac{6}{36}$ | $\frac{10}{36}$ | $\frac{6}{36}$ |
| $\frac{2}{36}$ | $\frac{3}{36}$ | $\frac{2}{36}$ |

ELECTRONIC DEVICE FOR MEASURING EFFECTIVE DYNAMIC RANGE LENGTH AND METHOD OF OPERATING THE ELECTRONIC DEVICE

CROSS-REFERENCE TO RELATED APPLICATION

This application is based on and claims priority under 35 U.S.C. § 119 to Korean Patent Application No. 10-2023-0120927, filed on Sep. 12, 2023, in the Korean Intellectual Property Office, the disclosure of which is incorporated by reference herein in its entirety.

BACKGROUND

Various example embodiments of inventive concepts relate to measuring an effective dynamic range (hereinafter, referred to as DR) length, and more specifically, to an electronic device that measures an effective DR length using an actual image and a method of operating the electronic device.

Image sensors capture 2-dimensional or 3-dimensional images of objects. An image sensor creates an image of an object using a photoelectric conversion element that responds to the intensity of light emitted from the object. Recently, various technologies have been developed to increase the DR of image sensors. These technologies are referred to as high dynamic range (HDR) technologies. DR refers to a ratio of the maximum radiance (or high radiance) to minimum radiance (or low radiance) that can be represented by the image sensor and is an important indicator of the performance of the image sensor.

Also, various HDR technologies may be applied to image sensors, and operation control methods vary according to each HDR technology. Therefore, it is difficult to objectively evaluate image quality levels between image sensors using different HDR technologies.

SUMMARY

Inventive concepts provide an electronic device that measures an effective dynamic range (DR) length of an image sensor by measuring a DR length of a target image using an actual image and a method of operating the electronic device.

Various technical objects of the inventive concepts are not limited to the technical objects mentioned above, and other technical objects not described herein are clearly understood by those skilled in the art from the following description.

Some example embodiments of inventive concepts provide a method of operating an electronic device, the method including receiving a plurality of reference code values respectively corresponding to a plurality of reference images captured by an image sensor during different exposure times, receiving a plurality of target code values corresponding to a target image captured by the image sensor, estimating an inverse camera response function (CRF) by adjusting a scale of the plurality of reference code values so that the scale of the plurality of reference code values matches a scale of the inverse CRF, wherein the inverse CRF estimates radiance corresponding to the plurality of reference code values, generating a radiance map based on the plurality of reference code values and the inverse CRF, and measuring an effective dynamic range (DR) length of the image sensor based on the radiance map and the plurality of target code values.

Some example embodiments of inventive concepts provide a method of operating an electronic device, the method including receiving a plurality of reference code values respectively corresponding to a plurality of reference images captured by an image sensor during different exposure times, receiving a plurality of target code values corresponding to a target image captured by the image sensor, estimating, based on the plurality of reference code values, an inverse camera response function (CRF) for estimating radiance corresponding to each of the plurality of reference code values, generating a radiance map based on the plurality of reference code values and the inverse CRF, determining a plurality of kernels respectively corresponding to the plurality of target code values based on an angle of gradient of an edge in the target image corresponding to each of the plurality of target code values, and measuring an effective dynamic range (DR) length of the image sensor based on the radiance map, the target code values, and the kernels, wherein at least one of the plurality of kernels includes an anisotropic kernel.

Some example embodiments of inventive concepts provide an electronic device including an inverse camera response function (CRF) estimation circuit configured to convert, into a log scale, a scale of a plurality of reference code values respectively corresponding to a plurality of reference images captured by an image sensor during different exposure times, wherein the inverse CRF estimation circuit is configured to estimate an inverse CRF based on the plurality of reference code values converted into the log scale, a radiance map generation circuit configured to generate a radiance map based on the inverse CRF and the plurality of reference code values having the log scale, a radiance-code function generation circuit configured to generate a radiance-code function based on the radiance map and a plurality of target code values corresponding to a target image captured by the image sensor, a signal-to-noise ratio code (SNR-code) function generation circuit configured to generate an SNR-code function for the target image by applying an anisotropic kernel to at least one of the target code values, and an effective dynamic range (DR) length measurement circuit configured to measure an effective DR length of the image sensor based on a target code value corresponding to radiance at which a slope of the radiance-code function is 0 and a code value corresponding to an SNR greater than or equal to a preset threshold in the SNR-code function.

BRIEF DESCRIPTION OF THE DRAWINGS

Various example embodiments will be more clearly understood from the following detailed description taken in conjunction with the accompanying drawings in which:

FIG. 6 is a diagram showing code values corresponding to a pixel array according to an example embodiment;

DETAILED DESCRIPTION

It will be understood that elements and/or properties thereof (e.g., structures, surfaces, directions, or the like), which may be referred to as being "perpendicular," "parallel," or the like with regard to other elements and/or properties thereof (e.g., structures, surfaces, directions, or the like) may be "perpendicular," "parallel," or the like or may be "substantially perpendicular," "substantially parallel," respectively, with regard to the other elements and/or properties thereof.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

Figure 1:
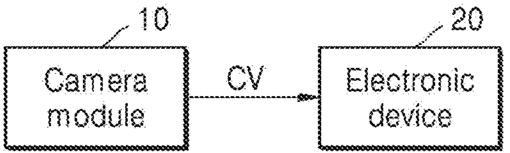
FIG. 1 is a block diagram showing a dynamic range (DR) measurement system according to an example embodiment.

FIG. 1 is a block diagram showing a dynamic range (DR) measurement system according to an example embodiment.

Referring to FIG. 1, the DR measurement system according to the inventive concepts may include a camera module 10 and an electronic device 20.

The camera module 10 may be mounted on an electronic product having an image or light sensing function. For example, the camera module 10 may be mounted on electronic products, such as a camera, a smartphone, a wearable device, an Internet of Things (IoT), a tablet personal computer (tablet PC), a personal digital assistant (PDA), a portable multimedia player (PMP), and a navigation device, but example embodiments are not limited thereto. Also, the camera module 10 may be mounted on electronic products that are provided as parts in vehicles, furniture, manufacturing facilities, doors, and various measurement devices, but example embodiments are not limited thereto.

The camera module 10 according to the inventive concepts may include an image sensor and be configured to transmit code values CVs corresponding to images captured by an image sensor to the electronic device 20. The image sensor and the code values CV are described below in detail with reference to FIG. 2.

The electronic device 20 according to the inventive concepts may receive a code value CV corresponding to an image captured by the camera module 10. The electronic device 20 may generate a radiance map on the basis of a plurality of code values respectively corresponding to a plurality of images captured during different exposure times. The electronic device 20 may generate a radiance-code function for the image received from the camera module 10 on the basis of the radiance map and the plurality of code values. The electronic device 20 may generate a signal-to-noise ratio-code function (SNR-code function) for the image on the basis of the code values CV corresponding to the image received from the camera module 10. The radiance map, the radiance-code function, and the SNR-code function are described below in detail. The electronic device 20 may measure an effective dynamic range (DR) length of the image sensor of the camera module 10 that captures the image, on the basis of the radiance-code function and the SNR-code function. In some example embodiments, the effective DR length may correspond to the ratio of the maximum radiance (or high radiance) and minimum radiance (or low radiance) that are distinguishable in the image captured by the image sensor. Accordingly, it may be difficult to represent a clear image in extremely dark or bright places (or alternatively, in dark or bright places) using an image sensor having a small effective DR length. Therefore, the DR is an important indicator (or is an indicator) for evaluating image sensor performance, and various technologies have been developed to improve the DR of image sensors. These technologies may be referred to as high dynamic range (HDR) technologies, and there are various methods of adding hardware and/or software to improve the DR.

As described above, each of the various methods for improving the DR of an image sensor may have its own advantages and disadvantages. For example, an image sensor according to one method of improving the DR of the image sensor has the advantage of improving the DR in a low luminance environment. An image sensor according to another method has the advantage of improving the DR in a high luminance environment. The electronic device 20 according to the inventive concepts may provide objective information about the performance of an image sensor by measuring the effective DR length of the image sensor, regardless of whether the HDR technology is applied to the image sensor.

The electronic device 20 according to the inventive concepts may measure the effective DR length of the image sensor using an actual image, in general indoor and outdoor environments without auxiliary devices (e.g., devices including charts) for adjusting illuminance. For example, a chart may generate light having a preset range of radiance. Accordingly, the image sensor may know a saturation point of the code value on the basis of the preset range of radiance, and thus, the performance of the image sensor may be measured. However, evaluation using the auxiliary devices may be performed in a room, and thus, the light generated by the auxiliary devices may be reflected in the room and focused on the image sensor in addition to the light generated by the auxiliary devices themselves, which may cause measurement results to be inaccurate. The electronic device 20 according to the inventive concepts may accurately measure the effective DR length of the image sensor using an actual image, in general indoor and outdoor environments without the auxiliary devices.

The electronic device 20 according to the inventive concepts may include a device equipped with a processor, such as a personal computer, capable of performing calculation operations according to commands. However, the electronic device 20 according to the inventive concepts is not limited thereto and may refer to various devices including a processor that performs operations according to the inventive concepts, for example, operations described below. Accordingly, the electronic device 20 and the methods disclosed herein may ultimately be used to generate images having a high image quality level by improving the DR of an image sensor using the measured effective DR length of the image sensor.

Figure 2:
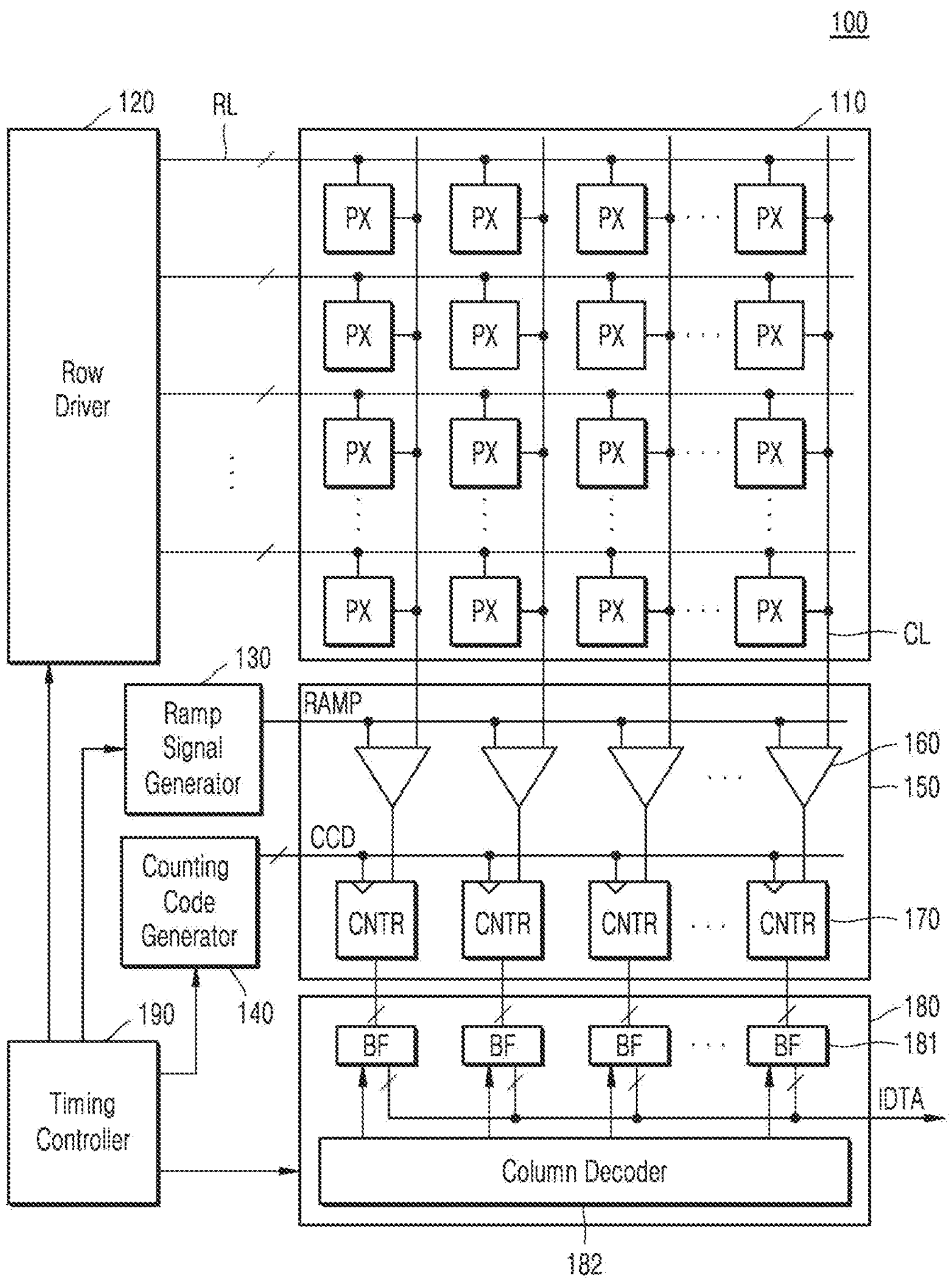
FIG. 2 is a block diagram showing an image sensor according to an example embodiment.

FIG. 2 is a block diagram showing an image sensor 100 according to an example embodiment.

The image sensor 100 may be provided in the camera module 10 (FIG. 1) described with reference to FIG. 1. Hereinafter, the image captured by the image sensor 100 may be used in the same sense as the image captured by the camera module 10 (FIG. 1).

The image sensor 100 may include a pixel array 110, a row driver 120, a ramp signal generator 130, a counting code generator 140, an analog-digital conversion circuit 150 (hereinafter, referred to as an ADC circuit), a data output circuit 180, and a timing controller 190.

The pixel array 110 may include a plurality of row lines RL, a plurality of column lines CL, and a plurality of pixels PX connected to a plurality of row lines RL and a plurality of column lines CL and arranged in rows and columns.

Each of the plurality of pixels PX may include at least one photoelectric conversion element, and the pixel PX may detect light using the photoelectric conversion element and output a pixel signal having an electrical signal according to the detected light.

The image sensor 100 may include pixels PX having a dual conversion gain to improve the DR. For example, the pixel PX may have the dual conversion gain by further including a conversion gain transistor between a reset transistor and a floating diffusion node. The dual conversion gain may be understood as a concept including a low conversion gain and a high conversion gain. In some example embodiments, the conversion gain refers to a rate at which electric charges accumulated in the floating diffusion node are converted into a voltage. Depending on (or based on) the conversion gain, the same amounts of electric charges accumulated in the floating diffusion node may be converted into different voltages. For example, the amount of electric charges accumulated in the floating diffusion node may be converted into a higher voltage when the pixel PX operates in a high conversion gain mode than when the pixel PX operates in a low conversion gain mode. As the pixel PX operates in the low conversion gain mode in a high luminance environment, the maximum radiance (or high radiance) represented by the image sensor 100 may increase. As the pixel PX operates in the high conversion gain mode in a low luminance environment, the minimum radiance (or low radiance) represented by the image sensor 100 may decrease. The image sensor 100 may generate one HDR image having an increased representable range of radiance by merging two images that are captured in the low conversion gain mode and the high conversion gain mode, respectively. The image sensor 100 may generate an HDR image by image-processing (merging) a plurality of images captured during different exposure times. Accordingly, the image sensor 100 may generate an HDR image by additionally including hardware and/or software components.

The row driver 120 drives the pixel array 110 in units of rows. The row driver 120 may select at least one row line RL among the plurality of row lines RL on the basis of a row control signal that is received from the timing controller 190. For example, the row driver 120 may generate a selection control signal that selects one of a plurality of rows. Also, from the pixels PX connected to the row line RL selected by the selection control signal provided from the row driver 120, the pixel array 110 may output, to the ADC circuit 150, a pixel signal corresponding to the amount of electric charges accumulated in the pixels PX connected to the selected row line RL, for example, a pixel voltage.

The ramp signal generator 130 may generate a ramp signal having a level that rises or falls at a certain slope under control by the timing controller 190. A ramp signal RAMP may be provided to each of a plurality of correlated double sampling (CDS) circuits 160 that are provided in the ADC circuit 150.

The counting code generator 140 may generate a counting code CCD under control by the timing controller 190. The counting code CCD may be provided to each of the plurality of counter circuits 170. In an example embodiment, the counting code generator 140 may be provided as a gray code generator. The counting code generator 140 may generate, as the counting code CCD, a plurality of code values having a resolution according to a set number of bits. For example, when a 10-bit code is set, the counting code generator 140 may generate a counting code CCD including 1024 code values that sequentially increase or decrease.

The ADC circuit 150 may include the plurality of CDS circuits 160 and the plurality of counter circuits 170. The ADC circuit 150 may convert a pixel signal input from the pixel array 110 into a pixel value that is a digital signal. In some example embodiments, the pixel value may correspond to one code value among the plurality of code values provided in the counting code CCD. Each pixel signal received via each of the plurality of column lines CL is converted into a code value, which is a digital signal, by a CDS circuit 160 and a counter circuit 170. For example, the pixel signal generated from each of the plurality of pixels PX in the image sensor 100 may be converted into a corresponding code value by the ADC circuit 150. Accordingly, code values corresponding to one image captured by the image sensor 100 (e.g., an image captured during one frame) may be equal to the number of pixels PX in the pixel array 110. Similarly, in some example embodiments, when the image sensor 100 generates one HDR image by merging a plurality of images (e.g., when generating one image by merging a plurality of images captured during at least two frames), the number of code values corresponding to one HDR image may be equal to the number of pixels PX provided in the pixel array 110.

The CDS circuit 160 may compare a pixel signal received via the column line CL, for example, a pixel voltage, with the ramp signal RAMP and may output the comparison result as a comparison result signal. In some example embodiments, when the level of the ramp signal RAMP and the level of the pixel signal are equal to each other, the CDS circuit 160 may output a comparison signal that transitions from a first level (e.g., logic high) to a second level (e.g., logic low). The time point at which the level of the comparison signal transitions may be determined according to the level of the pixel signal.

The counter circuit 170 may count level transition points of the comparison result signal that is output from the CDS circuit 160 and may output a count value. In an example embodiment, the counter circuit 170 may include a latch circuit. The latch circuit may receive the counting code CCD from the counting code generator 140 and the comparison signal from the CDS circuit 160 and may latch the code value of the counting code CCD corresponding to the time point at which the level of the comparison signal transitions.

The data output circuit 180 may temporarily store the code value output from the ADC circuit 150 and may then output the code value. The data output circuit 180 may include a plurality of column memories 181 and a column decoder 182. The column memories 181 may store the code values received from the counter circuits 170. Each of the plurality of column memories 181 may be provided in the counter circuit 170. A plurality of code values stored in the plurality of column memories 181 may be output as image data IDTA under control by the column decoder 182.

The timing controller 190 may output a control signal to each of the row driver 120, the ramp signal generator 130, the counting code generator 140, the ADC circuit 150, and the data output circuit 180 and may control the operation or timing of each of the row driver 120, the ramp signal generator 130, the counting code generator 140, the ADC circuit 150, and the data output circuit 180.

As described above, the image sensor 100 may additionally include various hardware and/or software components to generate an HDR image. In order to evaluate, using standardized/objectified indicators, the performance of each of image sensors 100 that generate HDR images on the basis of different methods (e.g., to measure the effective DR length), the electronic device 20 (FIG. 1) according to the inventive concepts may receive the plurality of code values respectively corresponding to the plurality of images captured by the image sensor 100.

For convenience of description, it has been described that the electronic device 20 (FIG. 1) according to the inventive concepts measures the effective DR length of the image sensor 100 that generates an HDR image, but the electronic device 20 (FIG. 1) according to the inventive concepts is not limited thereto. For example, the electronic device 20 (FIG. 1) according to the inventive concepts may measure the effective DR length of the image sensor 100 on the basis of a standard dynamic range (SDR) image. In some example embodiments, the SDR image may refer to an image to which HDR technology is not applied.

Figure 3:
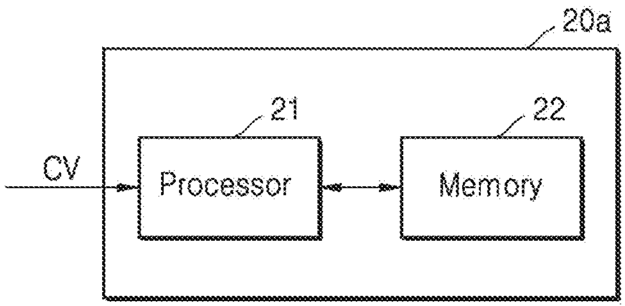
FIG. 3 is a block diagram showing an electronic device according to an example embodiment.

FIG. 3 is a block diagram showing an electronic device 20*a* according to an example embodiment.

Referring to FIG. 3, the electronic device 20*a* according to the inventive concepts may include a processor 21 and a memory 22. The electronic device 20*a* may correspond to the electronic device 20 (FIG. 1).

The processor 21 according to the inventive concepts may receive a code value CV from the image sensor 100 (FIG. 2) or the camera module 10 (FIG. 1). Hereinafter, receiving the code values from the image sensor 100 (FIG. 2) or the camera module 10 (FIG. 1) may be described as receiving the code values from the image sensor 100 (FIG. 2). The processor 21 may receive the code value CV from the image sensor 100 (FIG. 2) and measure the effective DR length of the camera module 10 (FIG. 1) or the image sensor 100 (FIG. 2). Hereinafter, measuring the effective DR length of the image sensor 100 (FIG. 2) or the camera module 10 (FIG. 1) may be described as measuring the effective DR length of the image sensor 100 (FIG. 2).

The memory 22 according to the inventive concepts may store functions generated by performing operations described below with reference to FIG. 4 and/or may store received code values. Also, the memory 22 may provide the stored functions and/or code values to the processor 21 in response to requests of the processor 21.

Figure 4:
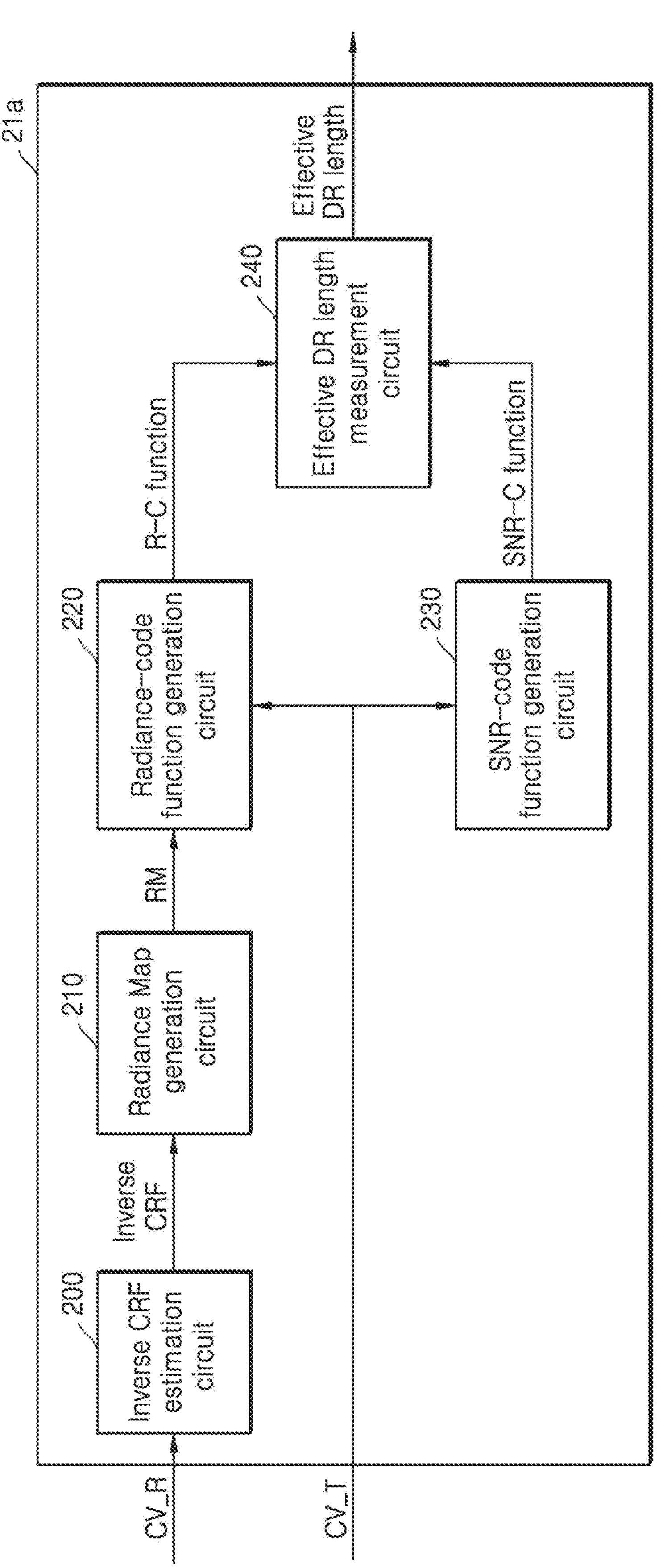
FIG. 4 is a block diagram showing a processor according to an example embodiment.

FIG. 4 is a block diagram showing a processor 21*a* according to an example embodiment.

The processor 21*a* may correspond to the processor 21 (FIG. 3), and repeated descriptions thereof are omitted.

Referring to FIG. 4, the processor 21*a* according to the inventive concepts may include an inverse camera response function (CRF) estimation circuit 200, a radiance map generation circuit 210, a radiance-code function generation circuit 220, a signal-to-noise ratio (SNR)-code function generation circuit 230, and an effective dynamic range (DR) length measurement circuit 240.

Figure 5A:
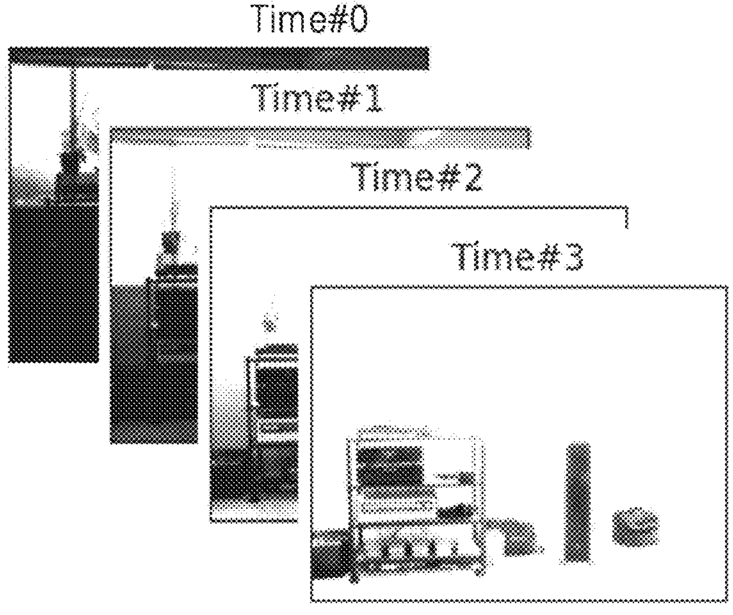
FIG. 5A is a diagram showing a plurality of reference images according to an example embodiment.

The inverse CRF estimation circuit 200 may receive reference code values CV_R respectively corresponding to a plurality of reference images from the image sensor 100 (FIG. 2). In some example embodiments, the plurality of reference images may include a plurality of images captured by the image sensor 100 (FIG. 2) during different exposure times. In addition, each of the plurality of reference images may include an SDR image. The plurality of reference images captured by the image sensor 100 (FIG. 2) during different exposure times may be understood with reference to FIG. 5A. FIG. 5A shows the plurality of reference images captured by the image sensor 100 (FIG. 2) during different exposure times.

Referring further to FIG. 5A, bright parts of a scene may be represented unclearly as exposure time increases, and dark parts of the scene may be represented unclearly as exposure time decreases. Accordingly, a first exposure time (Time #0) may be shorter than a second exposure time (Time #1). The plurality of reference code values respectively corresponding to the plurality of reference images may be used to estimate an inverse CRF as described below.

The inverse CRF estimation circuit 200 according to the inventive concepts may estimate the inverse CRF on the basis of the plurality of reference code values CV_R. The CRF may include a function representing the relationship between the radiance and the code values. For example, as described above with reference to FIG. 2, the image sensor may determine a corresponding code value according to an increase or decrease in radiance (in addition, according to an increase or decrease in exposure time). In some example embodiments, the code value corresponding to radiance may be determined by the CRF. The inverse CRF estimation circuit 200 according to the inventive concepts may estimate, based on the plurality of reference code values CV_R, the CRF for estimating the radiance corresponding to the plurality of reference code values CV_R. The inverse CRF estimation circuit 200 may adjust a scale of the plurality of reference code values CV_R so that the scale of the plurality of reference code values CV_R matches a scale of the inverse CRF. This is described below in detail.

The inverse CRF estimation circuit 200 may estimate the inverse CRF by Equation 1.

$$
\begin{aligned}
z_{ij} &= f(E_i \Delta T_j) \\
z_{ij}+1 &= f(E_i \Delta T_j)+1 \\
\log_2(z_{ij}+1) &= \log_2(f(E_i \Delta T_j)+1) = \hat{g}\,(E_i \Delta T_j) \\
\log_{10} \hat{g}^{-1}\,(\log_2(z_{ij}+1)) &= \log_{10} E_i + \log_{10} \Delta T_j \\
h(\log_2(z_{ij}+1)) &= \log_{10} E_i + \log_{10} \Delta T_j
\end{aligned}
\quad \text{[Equation 1]}
$$

In Equation 1, $E_i$ is the amount of light that is incident on the ith pixel of the pixel array 110 (e.g., in FIG. 2) per unit time. For example, this may represent the radiance. $\Delta T_j$ is the exposure time corresponding to a jth reference image. Accordingly, $E_i \Delta T_j$ may represent the total amount of light that is incident on the ith pixel of the jth reference image. Therefore, as the amount of incident light per unit time increases and the exposure time increases, the amount of electric charges accumulated in the ith pixel increases. Also, the reference code value corresponding thereto may increase. However, this is only an example and the inventive concepts are not limited thereto. The code values may tend to decrease as the amount of electric charges increases. $z_{ij}$ is a code value corresponding to a pixel signal that is generated from the ith pixel of the jth image. For example, $z_{ij}$ may be the ith reference code value, corresponding to the jth reference image, among the plurality of reference code values CV_R. f includes a non-linear function that represents the relationship between $E_i \Delta T_j$ and the reference code value ($z_{ij}$). For example, f may include a CRF. $\hat{g}$ is obtained by taking the logarithm of $z_{ij}+1$ so that the scale of the reference code value ($z_{ij}$) is adjusted to be the same as the scale of the inverse CRF. For example, the scale of the reference code value ($z_{ij}$) is adjusted to a log scale, which may substantially represent the CRF. In some example embodiments, the reference code value ($z_{ij}$) may be 0. Accordingly, 1 may be added to the reference code value ($z_{ij}$) as described above so that the antilogarithm does not become 0 when the scale of the code value ($z_{ij}$) is adjusted to the log scale. However, the inverse CRF estimation circuit 200 according to the inventive concepts is not limited thereto. In some example embodiments, when the reference code value ($z_{ij}$) is not 0, a scale may be adjusted to the log scale without adding 1. h includes a function that simply expresses $\log_{10}\hat{g}^{-1}$ and may represent an inverse CRF. Therefore, when different exposure times are known and the plurality of reference code values corresponding to the plurality of reference images with the different exposure times are also known, the electronic device 20 (FIG. 1) according to the inventive concepts may estimate h and thus estimate the radiance ($\log_{10} E_i$ or $E_i$) corresponding to the code value. For example, the electronic device 20 (FIG. 1) may receive information about the plurality of reference code values and different exposure times from the image sensor 100 (FIG. 2). The electronic device 20 (FIG. 1) may transmit information about different exposure times to the image sensor 100 (FIG. 2). The image sensor 100 (FIG. 2) may capture the plurality of reference images on the basis of received different exposure times and transmit a plurality of reference code values to the electronic device 20 (FIG. 1). The inverse CRF estimation circuit 200 according to the inventive concepts may estimate h by Equation 2. For example, the inverse CRF may be estimated.

$$
\underset{h(\log_2(z+1)),E}{\operatorname{argmin}} \left[ \sum_{i=0}^{N-1} \sum_{j=0}^{P-1} [w(z_{ij})(h(\log_2(z_{ij\_}1)) - \log_{10}\Delta T_j)]^2 + \lambda \sum_{\log_2(z+1)} \left[ w(z_{ij}) \frac{d^2 h(\log_2(z+1))}{d(\log_2(z+1))^2} \right]^2 \right] \quad \text{[Equation 2]}
$$

In Equation 2, $$
\lambda \sum\nolimits_{\log_2(z+1)} \left[ w(z_{ij}) \frac{d^2 h(\log_2(z+1))}{d(\log_2(z+1))^2} \right]^2
$$

is a regularization term, λ is a regularization coefficient, and w ($z_{ij}$) represents a weight value corresponding to the ith reference code value of the jth image. For example, when the reference code value has any value from 0 to 255, a reference code value with 127 located between 0 and 255 may have relatively less noise than a reference code value with 0 or 255. For example, this may be understood because a reference code value of 255 is a reference code value corresponding to a saturated state and a reference code value of 0 is a reference code value corresponding to an extremely dark portion (or alternatively, to a dark portion). Therefore, when a reference code value is 0 or 255, it may be difficult to trust the radiance estimated based on the reference code value. Therefore, in order to accurately estimate the inverse CRF, a reference code value having less noise among the plurality of reference code values may be multiplied by a larger weight value as described above. P is the number of reference images captured during different exposure times. Referring to Equation 2, h may be estimated relatively accurately when the regularization term $$
\left( \lambda \sum\nolimits_{\log_2(z+1)} \left[ w(z_{ij}) \frac{d^2 h(\log_2(z+1))}{d(\log_2(z+1))^2} \right]^2 \right)
$$

is minimal (or is low). Therefore, h may be estimated relatively accurately when the second-order derivative with respect to h is minimum (or is low). For example, when the second-order derivative with respect to the inverse CRF is minimum (or is low), the inverse CRF may be estimated relatively accurately.

Referring to the above description, h has a log scale, and the scale of $\log_2(z_{ij}+1)$, which is a variable of h and corresponds to the reference code value ($z_{ij}$), is also a log scale. Therefore, the second-order derivative with respect to h may be minimized (or lowered) to 0. On the other hand, when the process of adjusting the scale of the reference code value described above is omitted, the scale (log scale) of h and the scale (linear scale) of $z_{ij}+1$ corresponding to a variable of h are different from each other. In some example embodiments, the scales of the function and the variable are different from each other, and thus, it is difficult for the second-order derivative of h to be minimized (or lowered) to 0. Therefore, the scale of the reference code value is adjusted to match the scale of the inverse CRF, and thus, the inverse CRF estimation circuit 200 according to the inventive concepts may estimate the inverse CRF relatively accurately. The adjustment of the scale of the plurality of reference code values to match the scale of the inverse CRF has a concept including adjustment to the same scale and also may represent adjustment of the regularization term described above to a scale that may be minimized (or lowered).

The radiance map generation circuit 210 according to the inventive concepts may receive the inverse CRF from the inverse CRF estimation circuit 200. In addition, the radiance map generation circuit 210 may receive the reference code values CV_R respectively corresponding to the plurality of reference images from the image sensor 100 (FIG. 2). However, this is only an example, and the inventive concepts are not limited thereto. For example, the radiance map generation circuit 210 according to the inventive concepts may receive the plurality of reference code values CV_R from the inverse CRF estimation circuit 200, unlike the illustration in FIG. 4.

The radiance map generation circuit 210 may generate a radiance map RM on the basis of the inverse CRF and the plurality of reference code values CV_R. In some example embodiments, the radiance map generation circuit 210 may estimate the radiance corresponding to each of the plurality of reference code values CV_R using the inverse CRF on the basis of the reference code values CV_R and may generate the radiance map RM on the basis of the estimated radiance. The plurality of reference code values CV_R respectively correspond to the plurality of reference images captured by the image sensor 100 (FIG. 2) during different exposure times. Accordingly, the plurality of reference code values CV_R may include all code values corresponding to the radiance range that may be represented by the image sensor 100 (FIG. 2). The radiance map RM may be understood with reference to FIG. 5B, which is described below. The radiance map RM represents the radiance corresponding to the plurality of reference code values, and the radiance corresponding to an arbitrary code value (e.g., a target code value described below) may be estimated using the radiance map RM. However, the radiance represented in the radiance map RM is estimated on the basis of the reference code values and may thus differ from actual radiance and represent the range of radiance that may be represented by the image sensor.

The radiance-code function generation circuit 220 according to the inventive concepts may receive the radiance map RM from the radiance map generation circuit 210. In addition, the radiance-code function generation circuit 220 may receive target code values CV_T corresponding to a target image from the image sensor 100 (FIG. 2). In some example embodiments, the target image may refer to an image used as a target for measuring the effective DR length of the image sensor 100 (FIG. 2) and may refer to an HDR image with HDR technology applied. However, the inventive concepts are not limited thereto. For example, the target image according to the inventive concepts may include one of the plurality of reference images described above or may include a separate SDR image, to which HDR technology is not applied, other than the plurality of reference images.

The target image may correspond to a target image for measuring the effective DR length of the image sensor 100 (FIG. 2) and the reference image may correspond to an image used to generate the inverse CRF and the radiance map RM.

The radiance-code function generation circuit 220 may generate a radiance-code function (R-C function) on the basis of samples obtained by matching a target code value CV_T to the radiance map RM. In some example embodiments, the samples may refer to radiance of code values. For example, the radiance-code function generation circuit 220 may generate the R-C function by regressing radiance samples respectively corresponding to the target code values CV_T. The R-C function includes a function that represents the code value according to radiance. Accordingly, the R-C function may have the forms shown in FIGS. 9C and 9F. There is a limit to the maximum radiance (or high radiance) that may be represented by the camera module 10 (FIG. 1) or the image sensor 100 (FIG. 2). Accordingly, when the radiance is greater than or equal to a certain level as shown in FIGS. 9C and 9F, the code value corresponding thereto may remain constant despite the radiance increasing. Therefore, in the electronic device 20 (FIG. 1) according to the inventive concepts, the point corresponding to the radiance at which the slope of the R-C function is 0 may be determined as an upper cutoff of the effective DR length. For example, the electronic device 20 (FIG. 1) according to the inventive concepts may determine the upper cutoff of the effective DR length of the image sensor 100 (FIG. 2) on the basis of the R-C function. In some example embodiments, the upper cutoff of the effective DR length may correspond to the maximum radiance (or high radiance) that may be represented by the image sensor 100 (FIG. 2).

The SNR-code function generation circuit 230 according to the inventive concepts may receive the plurality of target code values CV_T corresponding to the target image from the image sensor 100 (FIG. 2). The SNR-code function generation circuit 230 may generate an SNR-code function (SNR-C function) on the basis of the target code values CV_T. In some example embodiments, the SNR-code function generation circuit 230 may calculate the average and standard deviation of adjacent code values corresponding to each of the plurality of target code values CV_T on the basis of the target code values CV_T and may then generate the SNR-C function.

The SNR-code function generation circuit 230 may calculate the average of adjacent code values using an anisotropic kernel and calculate the standard deviation on the basis of the difference between the average of adjacent code values and the target code values CV_T corresponding thereto. The anisotropic kernel and the average and standard deviation of adjacent code values are described below in detail with reference to FIGS. 7A and 7B.

The SNR-code function generation circuit 230 may calculate the SNR that corresponds to each of the plurality of target code values CV_T, on the basis of the ratio of the standard deviation to the average of adjacent code values corresponding to each of the plurality of target code values CV_T. The SNR-code function generation circuit 230 may generate the SNR-C function by extracting some of the plurality of target code values CV_T as samples and regressing the samples.

The SNR-code function generation circuit 230 may generate the SNR-C function by extracting samples of the target code values CV_T corresponding to some regions (or referred to as flat regions) other than edge regions. The edge region may refer to a region including edges above a certain level and the flat region may refer to a region including edges below the certain level. The edge region and flat region may be understood with reference to FIG. 8C. The standard deviation corresponding to the target code value may be large near an edge of the target image, and thus, the SNR corresponding to the target code value may be calculated to be small. For example, when the difference between the target code values corresponding to some regions of the target image is greater than the difference between the target code values corresponding to other regions of the target image, it can be said that the some regions include large edges. Therefore, when the target code values CV_T corresponding to edge regions are sampled, the SNR-code function thereof may be extracted relatively inaccurately. However, the SNR-code function generation circuit 230 according to the inventive concepts is not limited thereto and may extract the target code values CV_T corresponding to the edge regions as samples. However, even in this case, the target code values CV_T corresponding to an edge region including a relatively small edge among the edge regions may be extracted as samples. Therefore, the SNR-code function generation circuit 230 according to the inventive concepts may use the anisotropic kernel as described above to minimize (or lower) the influence of edges and may extract, as samples, target code values CV_T corresponding to a flat region and/or target code values CV_T corresponding to an edge region with a relatively small edge.

The SNR-C function includes a function that represents an SNR according to the code values (or radiance). Accordingly, the SNR-C function may have the forms shown in FIGS. 9B and 9C. In the camera module 10 (FIG. 1) or the image sensor 100 (FIG. 2), generated code values may be greatly affected (or may be affected) by noise as radiance decreases. Therefore, the target code value corresponding to an SNR less than or equal to a certain level may not be clearly represented in the target image. Therefore, the electronic device 20 (FIG. 1) according to the inventive concepts determines a target code value corresponding to an SNR greater than or equal to a certain level on the basis of the SNR-C function and may specify the lower cutoff of the effective DR length on the basis of the determined target code value. The electronic device 20 (FIG. 1) determines a target code value corresponding to an SNR greater than or equal to a preset threshold on the basis of the SNR-C function and may determine the lower cutoff of the effective DR length on the basis of the target code value. In some example embodiments, the preset threshold may include a predefined SNR value and refer to the minimum SNR for defining the effective DR length. In some example embodiments, when the SNR is too small (or is small), a region thereof in the target image may be represented unclearly. Accordingly, in the electronic device 20 (FIG. 1), the target code value corresponding to the SNR greater than or equal to the preset threshold may be determined as the lower cutoff of the effective DR length. For example, the preset threshold may be 0 [dB]. Referring to FIGS. 9B and 9C, the electronic device 20 (FIG. 1) may determine a target code value corresponding to when the SNR is 12 [dB] on the basis of the SNR-C function and may determine the lower cutoff of the effective DR length on the basis of the determined target code value. In some example embodiments, the lower cutoff of the effective DR length may correspond to the minimum radiance (or low radiance) that may be represented by the image sensor 100 (FIG. 2).

For example, the electronic device 20 (FIG. 1) according to the inventive concepts may determine the lower cutoff of the effective DR length of the image sensor 100 (FIG. 2) on the basis of the SNR-C function.

The effective DR length measurement circuit 240 according to the inventive concepts may receive the R-C function from the radiance-code function generation circuit 220 and receive the SNR-C function from the SNR-code function generation circuit 230. Referring to the above description, the effective DR length measurement circuit 240 according to the inventive concepts may complete measurement of the effective DR length by determining the upper cutoff of the effective DR length on the basis of the R-C function and determining the lower cutoff of the effective DR length on the basis of the SNR-C function. Therefore, the electronic device 20 (FIG. 1) according to the inventive concepts may measure objective DR performance by measuring the effective DR length, regardless of the HDR technology applied to the image sensor 100 (FIG. 2) or the camera module 10 (FIG. 1).

Figure 5B:
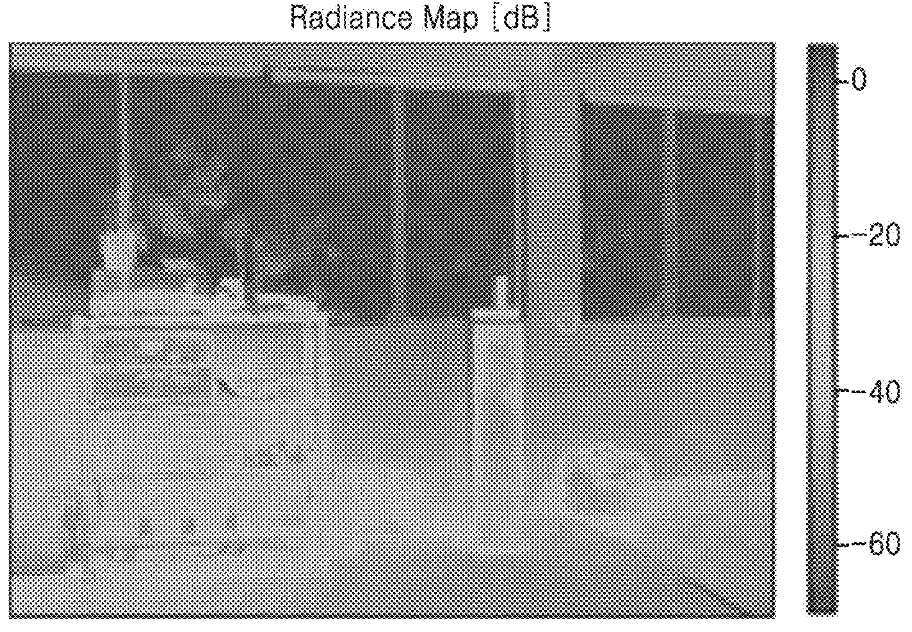
FIG. 5B is a diagram showing a radiance map according to an example embodiment.
Figure 5C:
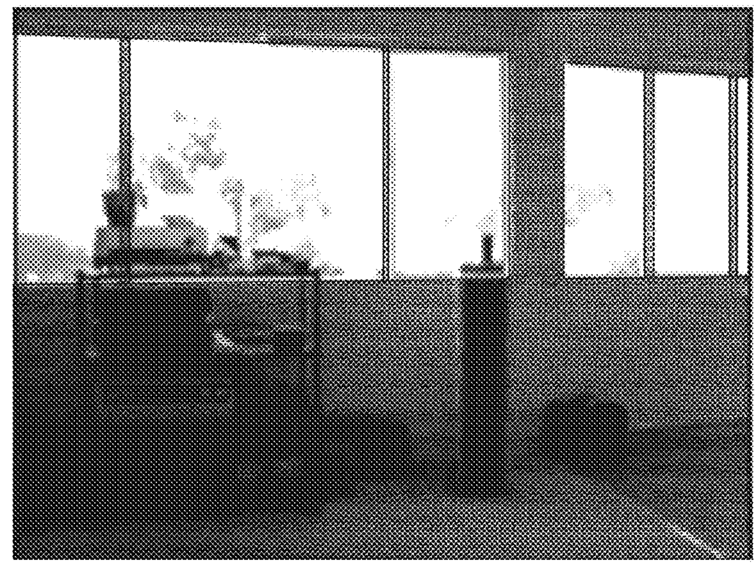
FIG. 5C is a diagram showing a target image according to an example embodiment.

FIG. 5A is a diagram showing a plurality of reference images according to an example embodiment, FIG. 5B is a diagram showing a radiance map according to an example embodiment, and FIG. 5C is a diagram showing a target image according to an example embodiment.

When describing FIGS. 5A, 5B, and 5C, repeated descriptions as those given above are omitted.

FIG. 5A shows four reference images captured by the image sensor 100 (FIG. 2) or the camera module 10 (FIG. 1) during different exposure times (Time #0, Time #1, Time #2, and Time #3). Referring to the above description, the electronic device 20 (FIG. 1) according to the inventive concepts may receive the plurality of reference code values corresponding to each of the four reference images in FIG. 5A and may generate the radiance map (FIG. 5B) on the basis of the plurality of reference code values.

Referring to FIG. 5A, a first exposure time (Time #0) may be shorter than a second exposure time (Time #1), the second exposure time (Time #1) may be shorter than a third exposure time (Time #2), and the third exposure time (Time #2) may be shorter than a fourth exposure time (Time #3). Each of the four reference images captured during different exposure times may be images for the same scene. The four reference images are captured during different exposure times, and thus, the reference code values corresponding to the same position may be different from each other.

FIG. 5B shows radiance map generated by the electronic device 20 (FIG. 1) according to the inventive concepts, on the basis of a plurality of reference code values corresponding to each of the four reference images described above with reference to FIG. 5A. The radiance map of FIG. 5B shows relative radiance according to locations on the image captured by the image sensor 100 (FIG. 2).

FIG. 5C shows a target image captured by the image sensor 100 (FIG. 2). As described above, the target image may include an HDR image to which HDR technology is applied. As described above, the electronic device 20 (FIG. 1) according to the inventive concepts may generate the radiance-code function (R-C function) on the basis of the radiance map and the target image and generate the effective DR length on the basis of the R-C function.

FIG. 6 is a diagram showing code values corresponding to a pixel array 110*a* according to an example embodiment.

FIG. 6 is a diagram showing the pixel array 110*a* including pixels arranged in a 7×7 form. One quadrangle shown in FIG. 6 may correspond to the pixel PX (FIG. 2), and the pixel array 110*a* of FIG. 6 may correspond to the pixel array 110 of FIG. 2. Therefore, repeated descriptions as those given above are omitted below.

Referring to FIG. 6 and the above description, the code value CV_11 may represent a code value corresponding to a pixel located in a first row R1 and a first column C1. For example, the code value CV_11 may represent a code value corresponding to a pixel signal generated from the pixel located in the first row R1 and the first column C1. Similarly, the other code values CV_12 to CV_77 may respectively correspond to the other pixels.

The plurality of code values CV_11 to CV_77 may correspond to one image captured by the pixel array 110*a*. The plurality of code values CV_11 to CV_77 do not represent code values corresponding to a specific image. For example, a plurality of code values CV_11 to CV_77 may be understood as a plurality of reference code values that correspond to one of a plurality of reference images according to an example described below. Alternatively, the plurality of code values CV_11 to CV_77 may be understood as a plurality of target code values that correspond to a target image according to an example described below.

Figure 7A:
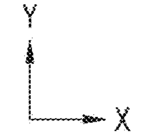
FIGS. 7A and 7B are diagrams showing an anisotropic kernel according to an example embodiment and FIG. 7C is a diagram showing a signal-to-noise ratio (SNR) map according to an example embodiment.
Figure 7B:
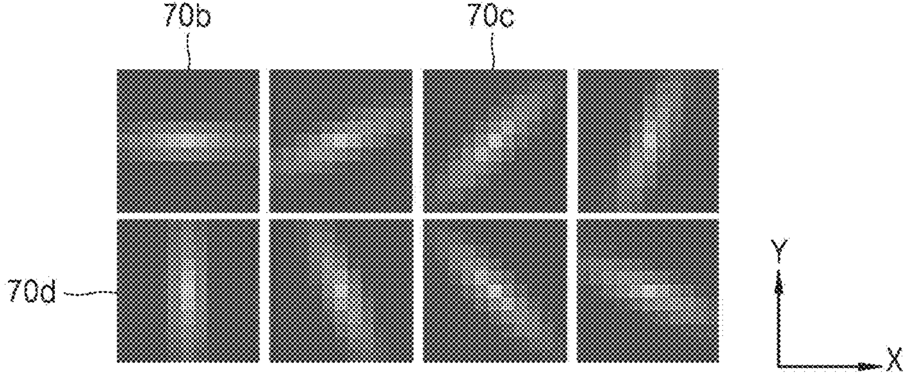
Figure 7C:
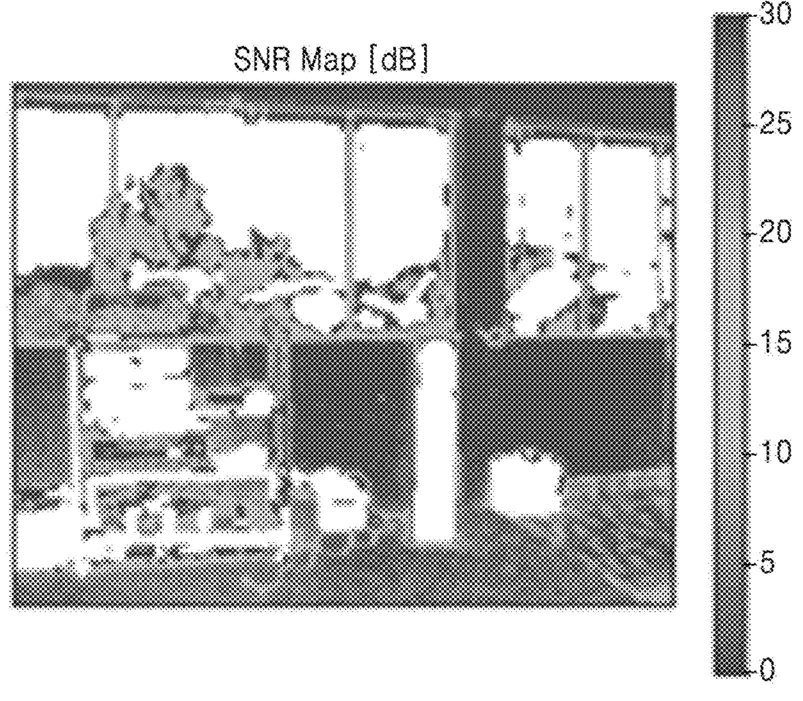

FIGS. 7A and 7B are diagrams showing an anisotropic kernel 70*a* according to an example embodiment and FIG. 7C is a diagram showing a SNR map according to an example embodiment.

Referring to the above description, the electronic device 20 (FIG. 1) according to the inventive concepts may receive the target code values corresponding to the target image from the image sensor 100 (FIG. 2) and generate the SNR-code function (SNR-C function) on the basis of the target code values. In some example embodiments, the electronic device 20 (FIG. 1) may calculate the average of adjacent code values by applying an anisotropic kernel to each of the target code values and calculate the standard deviation on the basis of the difference between the target code values and the corresponding adjacent code values. Accordingly, the SNR-C function may be generated. In some example embodiments, application of the anisotropic kernel to the code values may be used in the same sense as filtering of the code values using the anisotropic kernel.

FIG. 7A shows the anisotropic kernel 70*a* in a 3×3 form. An anisotropic kernel corresponds to an isotropic kernel and may refer to a kernel having a large weight value in a specific direction. The isotropic kernel may have weight values equal to each other in size in all directions in the kernel, but the anisotropic kernels may have weight values different from each other depending on (or based on) distances and/or directions. For example, referring to FIG. 7A, for a center weight value (10/36) of the anisotropic kernel 70*a*, a weight value (6/36) adjacent thereto in an x-direction (hereinafter, referred to as the first direction) may be greater than a weight value (3/36) adjacent thereto in a y-direction (hereinafter, referred to as the second direction). Referring to the above description, the electronic device 20 (FIG. 1) according to the inventive concepts may use an anisotropic kernel in order to minimize (or lower) the influence of edges of the target image. For example, when an edge exists in the second direction for a corresponding reference code value, the electronic device 20 (FIG. 1) may apply the anisotropic kernel 70*a* of FIG. 7A to the corresponding reference code value.

Referring to FIGS. 6 and 7A together, the electronic device 20 (FIG. 1) according to the inventive concepts may calculate the average of adjacent code values for a code value CV_22 corresponding to a pixel located in a second row R2 and a second column C2 of FIG. 6 by utilizing the anisotropic kernel 70*a* of FIG. 7A. Accordingly, when the anisotropic kernel 70*a* is applied to the code value CV_22, the average of adjacent code values is $(2\times CV_{11}+3\times CV_{12}+2\times CV_{13}+6\times CV_{21}+10\times CV_{22}+6\times CV_{23}+2\times CV_{31}+3\times CV_{32}+2\times CV_{33})/36$. The electronic device 20 (FIG. 1) may calculate the standard deviation corresponding to the code value CV_22 on the basis of the difference between the code value CV_22 and the average of adjacent code values. In some example embodiments, when calculating the average of adjacent code values for the code value CV_11 corresponding to the pixel located in the first row R1 and first column C1, padding may be utilized. For example, the pixel located in the first row R1 and first column C1 is located at the edges of the image. Accordingly, an anisotropic kernel may be applied thereto, assuming that appropriate code values exist around the pixel located in the first row R1 and the first column C1. For example, an anisotropic kernel may be utilized assuming that the code values are 0 around the pixel located in the first row R1 and the first column C1. However, this is only an example, and the inventive concepts are not limited thereto.

The electronic device 20 (FIG. 1) may calculate the SNR corresponding to each of the plurality of target code values, on the basis of the average and standard deviation of adjacent code values corresponding to each of the plurality of target code values. The electronic device 20 (FIG. 1) may generate an SNR-code function (SNR-C function) by sampling some of the SNRs corresponding to each of the plurality of target code values.

FIG. 7C shows an SNR Map on the basis of the target image of FIG. 5C and the SNR-C function generated based on the target image. The SNR Map is for visualizing the SNR that corresponds to each of the plurality of target code values corresponding to the target image.

The electronic device 20 (FIG. 1) according to the inventive concepts may determine the anisotropic kernel to be applied by considering edges of the target image. The electronic device 20 (FIG. 1) according to an example embodiment may detect an edge using a vertical/horizontal edge detector and apply the anisotropic kernel thereto by considering the magnitude of gradient and angle of gradient of the detected edge. For example, the electronic device 20 (FIG. 1) may detect an edge using a Sobel filter, Scharr filter, etc. The electronic device 20 (FIG. 1) according to an example embodiment may apply kernels having large weight values in different directions and select the kernel having the smallest standard deviation as the anisotropic kernel. However, the inventive concepts are not limited thereto, and various filtering methods may be applied considering edges of the target image.

FIG. 7B shows eight anisotropic kernels having large weight values in different directions. As described above, the electronic device 20 (FIG. 1) may determine the anisotropic kernel to be applied by considering edges of the target image. For example, when there is an edge in the second direction for a certain target code value, the electronic device 20 (FIG. 1) may calculate the average of adjacent code values corresponding to the target code value by applying an anisotropic kernel, such as a first anisotropic kernel 70*b*, having a large weight value in the first direction. Similar to the method described above, when there is a diagonal edge (e.g., a right downward diagonal) for a certain target code value, an anisotropic kernel, such as a second anisotropic kernel 70*c*, having a large weight value in a diagonal direction going upward to the right may be applied to calculate the average of adjacent code values corresponding to the target code value. Similarly, when there is an edge in the first direction for a certain target code value, an anisotropic kernel, such as a third anisotropic kernel 70*d*, having a large weight value in the second direction may be applied to calculate the average of adjacent code values corresponding to the target code value. The case in which each of the other anisotropic kernels shown in FIG. 7B is applied may be understood by the above description.

Figure 8A:
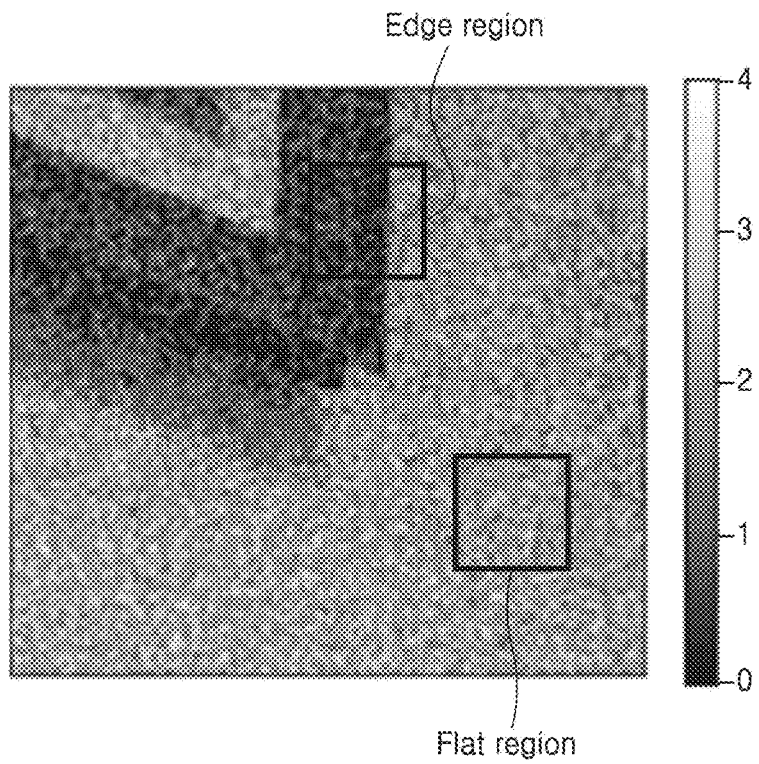
FIG. 8A is a diagram showing a target image according to an example embodiment and FIGS. 8B and 8C are diagrams showing SNR maps according to an example embodiment.
Figure 8B:
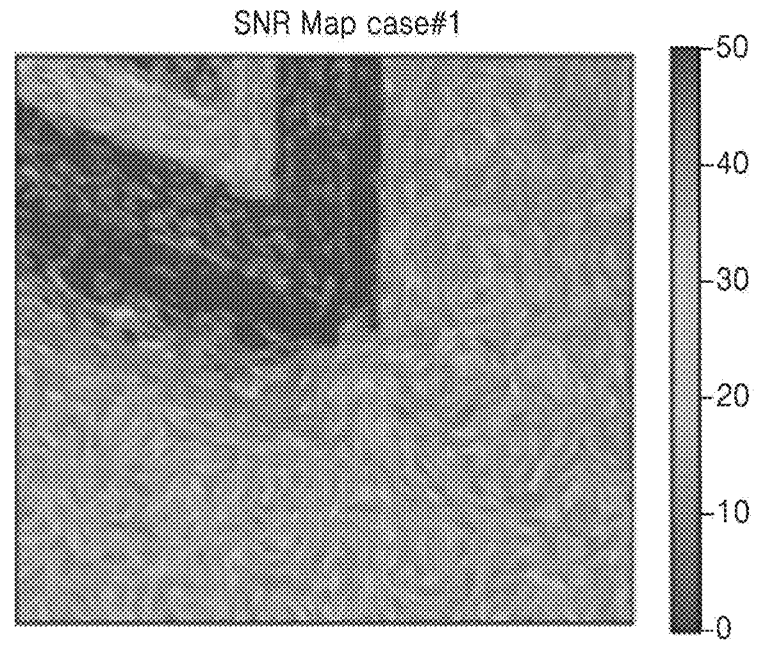
Figure 8C:
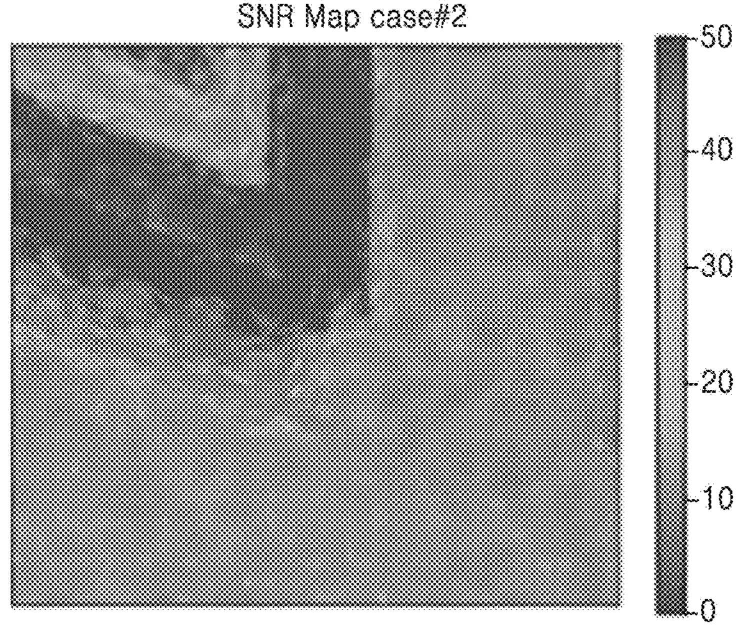

FIG. 8A is a diagram showing a target image according to an example embodiment and FIGS. 8B and 8C are diagrams showing SNR maps according to an example embodiment.

The SNR map of FIG. 8B is generated as the electronic device 20 (FIG. 1) according to the inventive concepts applies the above-described anisotropic kernel to the target image of FIG. 8A. As described above, the electronic device 20 (FIG. 1) may detect an edge for each of the plurality of target code values and apply the anisotropic kernel by considering the detected edge.

The SNR map of FIG. 8C is generated as the electronic device 20 (FIG. 1) according to the inventive concepts applies an isotropic kernel together with the above-described anisotropic kernel to the target image of FIG. 8A. The electronic device 20 (FIG. 1) according to the inventive concepts may detect an edge as described above. The electronic device 20 (FIG. 1) may apply the anisotropic kernel when an edge above a certain level is detected (e.g., when a region is determined to be an edge region) and may apply the isotropic kernel when an edge below a certain level is detected (e.g., when a region is determined to be a flat region).

Comparing FIGS. 8B and 8C with each other, regions near the edge regions may be represented as similar textures in the SNR maps (SNR Map case #1 and SNR Map case #2) of FIGS. 8B and 8C, respectively. On the other hand, FIG. 8B is the SNR map (SNR Map case #1) in which an anisotropic kernel is applied to the flat region and FIG. 8C is the SNR map (SNR Map case #2) in which an isotropic kernel is applied to the flat region. Therefore, in each of the SNR maps (SNR Map case #1 and SNR Map case #2), regions near the flat regions may be represented as different textures.

Figure 9A:
FIGS. 9A and 9D show target images according to an example embodiment.
Figure 9B:
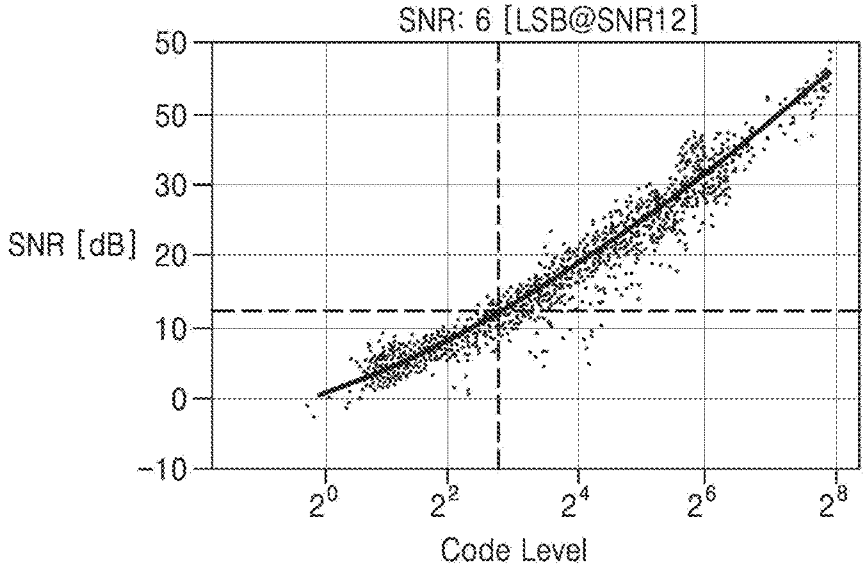
FIGS. 9B and 9C show an SNR-code function and a radiance-code function, respectively, corresponding to the target image in FIG. 9A, and FIGS. 9E and 9F show an SNR-code function and a radiance-code function, respectively, corresponding to the target image in FIG. 9D.
Figure 9C:
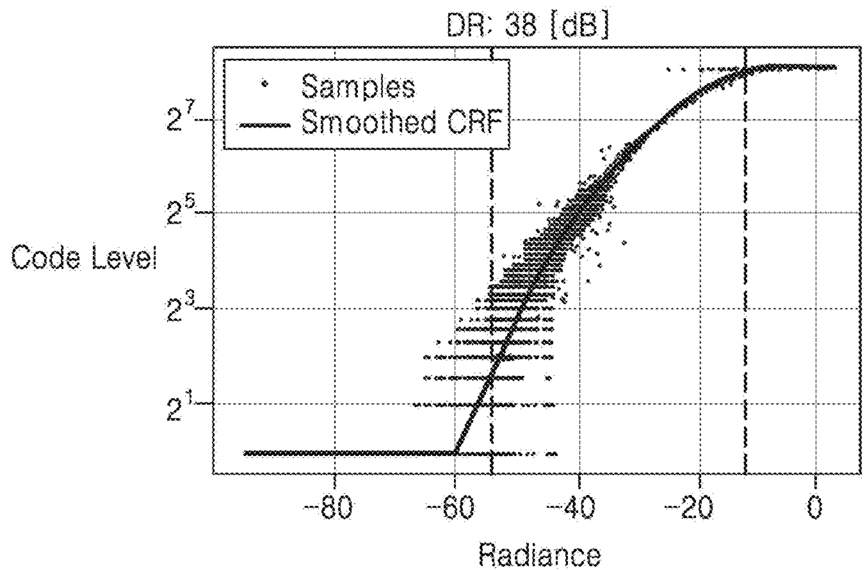
Figure 9D:
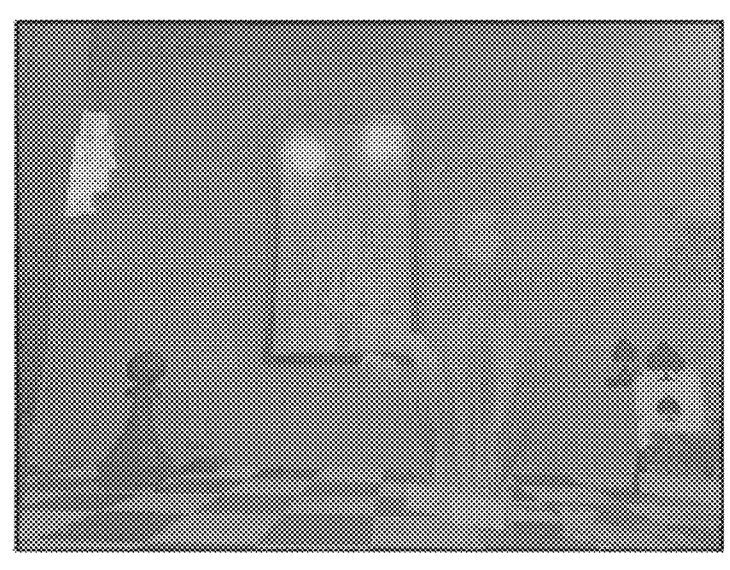
Figure 9E:
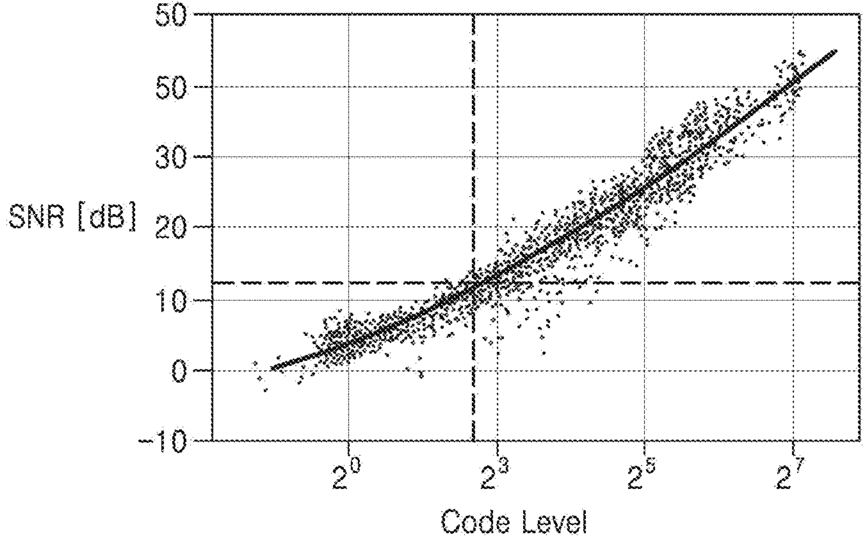
Figure 9F:
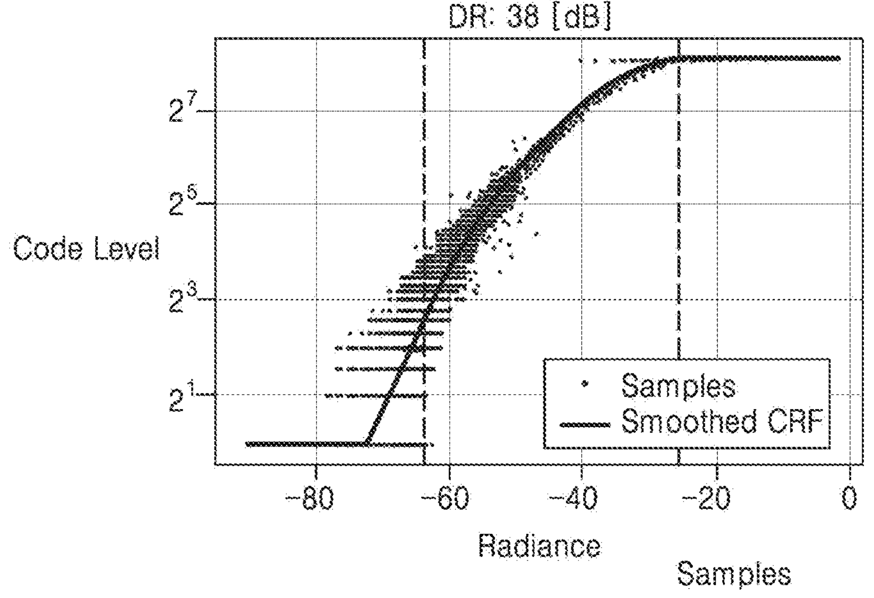

FIGS. 9A and 9D show target images according to an example embodiment, FIGS. 9B and 9C show an SNR-C function and a R-C function, respectively, corresponding to the target image in FIG. 9A, and FIGS. 9E and 9F show an SNR-C function and a R-C function, respectively, corresponding to the target image in FIG. 9D.

The target images of FIGS. 9A and 9D are captured by the same image sensor 100 (FIG. 2) or camera module 10 (FIG. 1). FIGS. 9B and 9C respectively show the SNR-C function and the R-C function generated by the electronic device 20 (FIG. 1) according to the inventive concepts on the basis of the target image of FIG. 9A. FIGS. 9E and 9F respectively show the SNR-C function and the R-C function generated by the electronic device 20 (FIG. 1) according to the inventive concepts on the basis of the target image of FIG. 9D. FIGS. 9A and 9D are images captured by the same image sensor 100 (FIG. 2), and thus, the effective DR lengths of the image sensor 100 (FIG. 2) or the camera module 10 (FIG. 1) measured by the electronic device 20 (FIG. 1) according to the inventive concepts on the basis of the images of FIGS. 9A and 9D have to be identical or very close to each other. Referring to FIGS. 9C and 9F, it can be seen that the effective DR lengths determined as described above are equal to each other (38 [dB]).

Figure 10:
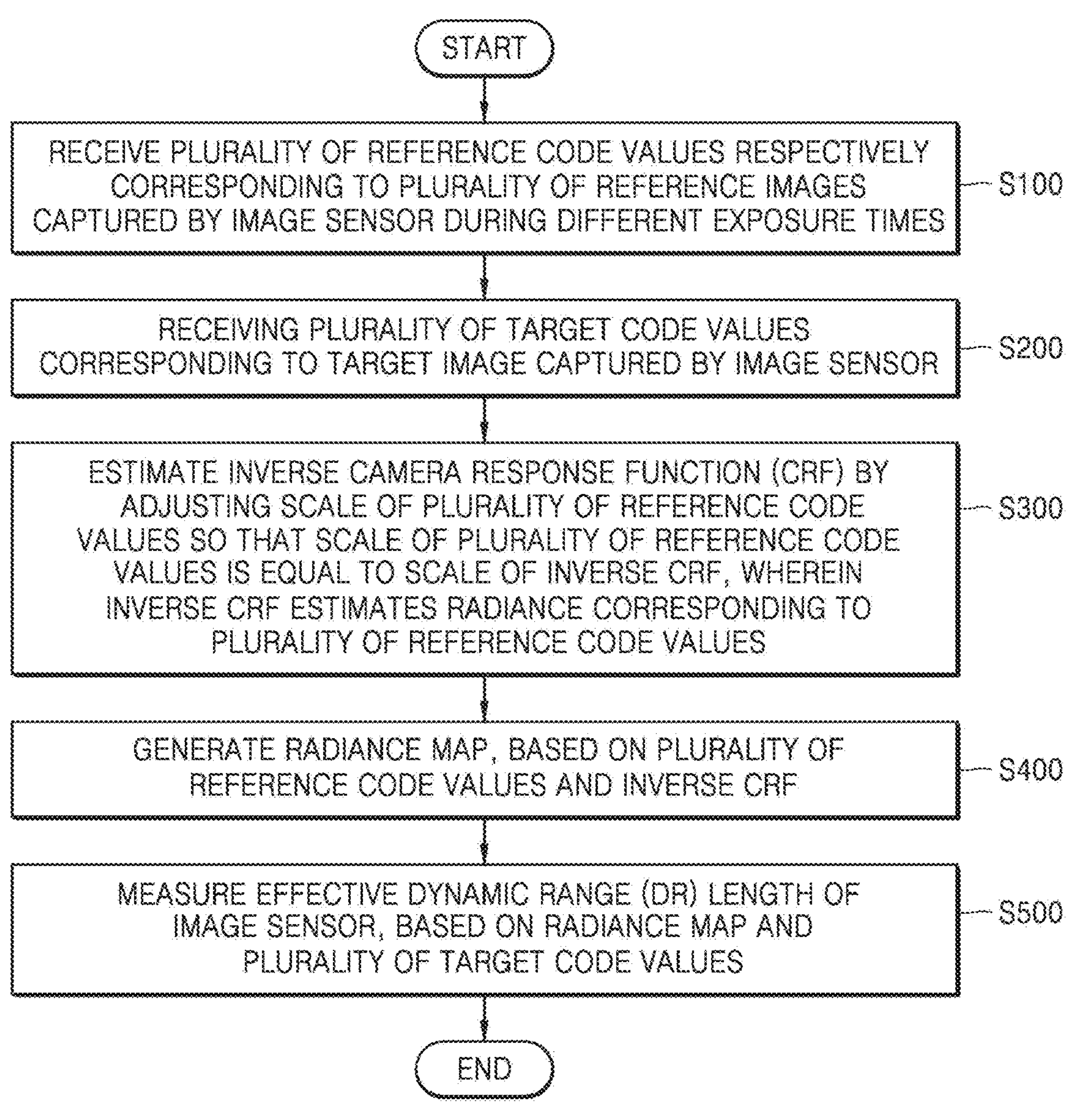
FIG. 10 is a flowchart illustrating a method of operating an electronic device, according to an example embodiment.

FIG. 10 is a flowchart illustrating a method of operating an electronic device, according to an example embodiment.

Referring to FIG. 10, in operation S100, the electronic device 20 (FIG. 1) may receive a plurality of reference code values respectively corresponding to a plurality of reference images captured by an image sensor during different exposure times. In some example embodiments, the plurality of reference images may include SDR images. The electronic device 20 (FIG. 1) may receive the plurality of reference code values from the camera module 10 (FIG. 1) including an image sensor. Alternatively, the electronic device 20 (FIG. 1) may receive the plurality of reference code values from the image sensor.

In operation S200, the electronic device 20 (FIG. 1) may receive a plurality of target code values corresponding to the target image captured by the image sensor. In some example embodiments, the target image may include an HDR image. However, the inventive concepts are not limited thereto, and the target image may include an SDR image or any one of the plurality of reference images described above. The electronic device 20 (FIG. 1) may receive the plurality of target code values from the camera module 10 (FIG. 1) including an image sensor. Alternatively, the electronic device 20 (FIG. 1) may receive the plurality of target code values from the image sensor.

In operation S300, the electronic device 20 (FIG. 1) may estimate an inverse camera response function (CRF) by adjusting a scale of the plurality of reference code values so that the scale of the plurality of reference code values is equal to a scale of the inverse CRF, wherein the inverse CRF estimates radiance corresponding to the plurality of reference code values. For example, the scale of the inverse CRF may be a log scale, the scale of the reference code values before the adjustment may be a linear scale, and the scale of the reference code values after the adjustment may be a log scale that is the same as the inverse CRF.

In operation S400, the electronic device 20 (FIG. 1) may generate a radiance map on the basis of the plurality of reference code values and the estimated inverse CRF.

In operation S500, the electronic device 20 (FIG. 1) may measure an effective dynamic range (DR) length of the image sensor on the basis of the radiance map and the plurality of target code values.

Figure 11:
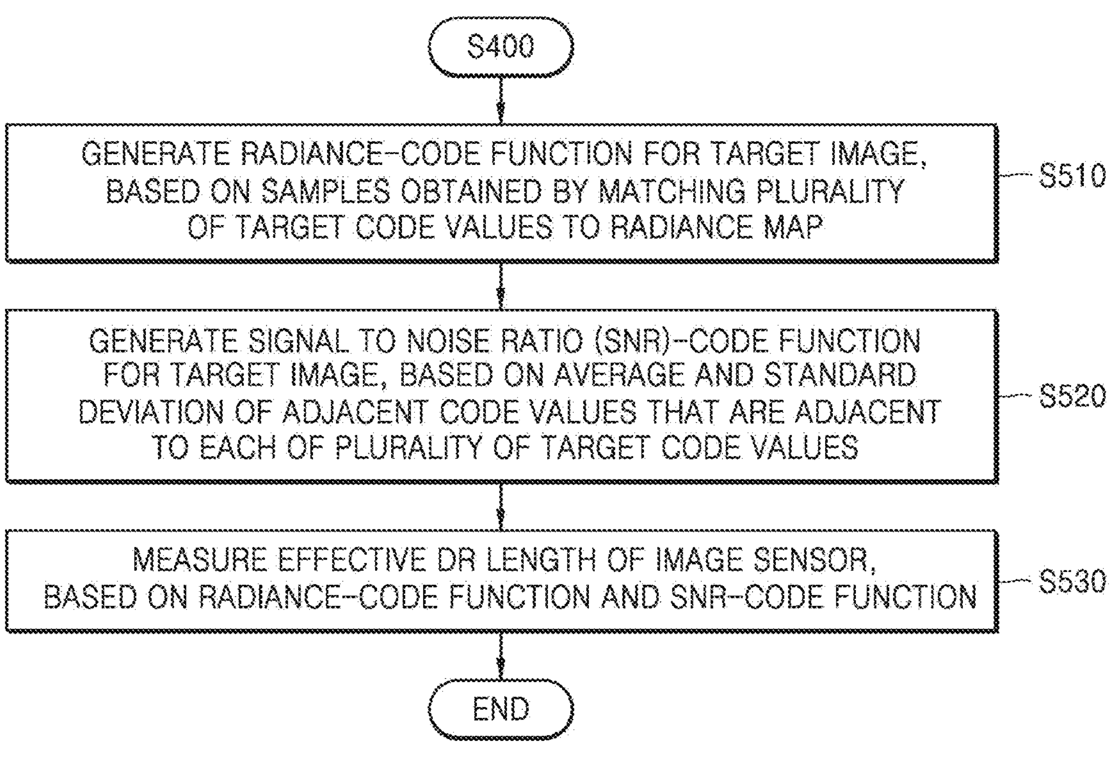
FIG. 11 is a flowchart illustrating a method of operating an electronic device, according to an example embodiment.

FIG. 11 is a flowchart illustrating a method of operating an electronic device, according to an example embodiment.

Operation S510, operation S520, and operation S530 of FIG. 11 are detailed operations in operation S500 according to an example embodiment described above with reference to FIG. 10.

Referring to FIG. 11, in operation S510, the electronic device 20 (FIG. 1) may generate a radiance-code function (R-C function) for the target image, on the basis of samples obtained by matching the plurality of target code values to the radiance map.

In operation S520, the electronic device 20 (FIG. 1) may generate a signal-to-noise ratio-code function (SNR-C function) for the target image, on the basis of the average and standard deviation of adjacent code values for each of the target code values. The electronic device 20 (FIG. 1) according to the inventive concepts may calculate the average of adjacent code values for each of the plurality of target code values, on the basis of anisotropic kernels respectively corresponding to the plurality of target code values.

In some example embodiments, each of the anisotropic kernels may be determined on the basis of the edge for the target code value corresponding to the anisotropic kernel. For example, the electronic device 20 (FIG. 1) according to an example embodiment may determine an anisotropic kernel to be applied to the target code value, by considering the magnitude of gradient of the edge and/or the angle of gradient of the edge. The electronic device 20 (FIG. 1) according to another example embodiment may apply an anisotropic kernel or an isotropic kernel to each of the plurality of target code values. The anisotropic kernel may be applied to a target code value that has a relatively large difference from adjacent target code values and the isotropic kernel may be applied to a target code value that has a relatively small difference from adjacent target code values.

The electronic device 20 (FIG. 1) according to the inventive concepts may calculate the standard deviation for the target code value, on the basis of the difference between the target code value and the average of adjacent code values corresponding thereto. The electronic device 20 (FIG. 1) may sample some regions of the target image to generate the SNR-C function. For example, the electronic device 20

(FIG. 1) may generate the SNR-C function on the basis of the average and standard deviation of adjacent code values corresponding to some regions. In some example embodiments, the some regions may include fewer edges or may have a smaller magnitude of gradient of edges than the other regions of the target image.

In operation S530, the electronic device 20 (FIG. 1) may measure the effective DR length of the image sensor, on the basis of the R-C function and the SNR-C function. The electronic device 20 (FIG. 1) according to the inventive concepts may measure the effective DR length by specifying the lower cutoff of the effective DR length on the basis of the SNR-C function and specifying the upper cutoff of the effective DR length on the basis of the R-C function. For example, the electronic device 20 (FIG. 1) according to an example embodiment may specify the upper cutoff of the effective DR length on the basis of the point at which the slope of the R-C function is 0 and may specify the lower cutoff of the effective DR length on the basis of the target code value corresponding to the SNR greater than 0 in the SNR-C function.

Figure 12:
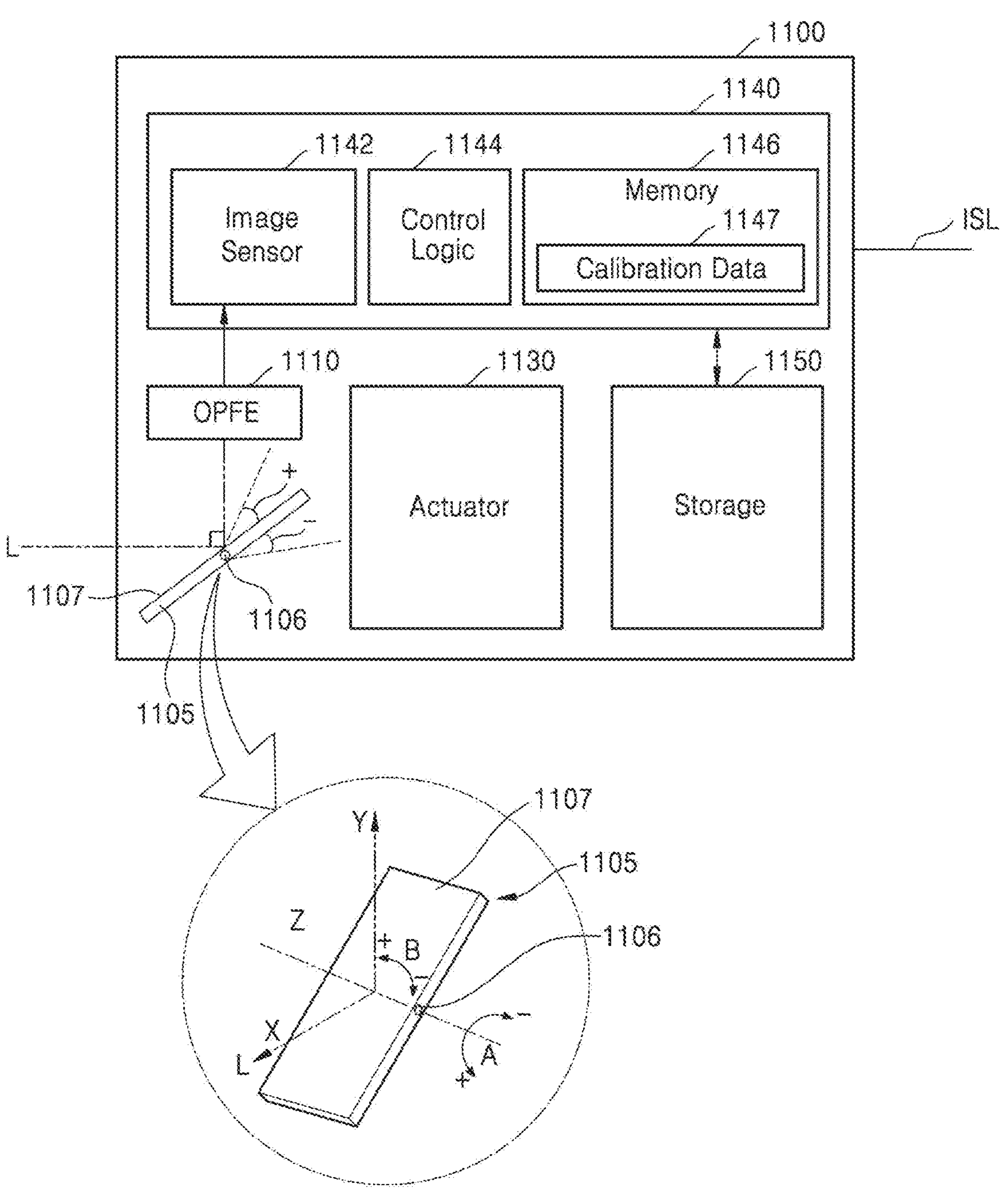
FIG. 12 is a block diagram showing a camera module according to an example embodiment.

FIG. 12 is a block diagram showing a camera module 1100 according to an example embodiment.

The camera module 1100 of FIG. 12 may correspond to the camera module 10 (FIG. 1), and an image sensor 1142 may correspond to the image sensor 100 (FIG. 2). Therefore, repeated descriptions as those given above may be omitted.

Referring to FIG. 12, the camera module 1100 may include a prism 1105, an optical path folding element (hereinafter, referred to as "OPFE") 1110, an actuator 1130, an image sensing device 1140, and a storage 1150.

The prism 1105 includes a reflective surface 1107 of a light-reflecting material and may change a path of light L incident from the outside. For example, the prism 1105 may change the path of light L incident in a first direction X to a second direction Y perpendicular to the first direction X. In addition, the prism 1105 may rotate the reflective surface 1107 of the light-reflecting material in a direction A about a central axis 1106 or rotate the central axis 1106 in a direction B and may change the path of light L incident in the first direction X to the second direction Y perpendicular thereto. In some example embodiments, the OPFE 1110 may also move in a third direction Z perpendicular to both the first direction X and the second direction Y.

The OPFE 1110 may include, for example, optical lenses including m groups (where m is a natural number). The m lenses may change an optical zoom magnification ratio of the camera module 1100 by moving in the second direction Y. For example, when a basic optical zoom magnification ratio of the camera module 1100 is Z, if the m optical lenses of the OPFE 1110 move, the optical zoom magnification ratio of the camera module 1100 may be changed to 3Z or higher.

The actuator 1130 may move the OPFE 1110 or an optical lens (hereinafter, referred to as an optical lens) to a specific position. For example, the actuator 1130 may adjust the position of the optical lens so that the image sensor 1142 is located at the focal length of the optical lens for accurate sensing.

The image sensing device 1140 may include an image sensor 1142, a control logic 1144, and a memory 1146. The image sensor 1142 may sense an image of an object to be sensed, using the light L provided via the optical lens.

The control logic 1144 may control all operations of the camera module 1100. For example, the control logic 1144 may control the operation of the camera module 1100 according to a control signal provided from outside the camera module 1100.

The memory 1146 may store information, such as calibration data 1147, necessary (or advantageous) for the operation of the camera module 1100. The calibration data 1147 may include information that is necessary for the camera module 1100 to generate image data using the light L provided from the outside. The calibration data 1147 may include, for example, information about the degree of rotation, information about the focal length, and information about the optical axis, which are described above.

The storage 1150 may store image data sensed by the image sensor 1142. The storage 1150 may be placed outside the image sensing device 1140 and may be provided while being stacked with a sensor chip that constitutes the image sensing device 1140. The storage 1150 may be provided as an electrically erasable programmable read-only memory (EEPROM), but example embodiments are not limited thereto.

The camera module 1100 may include a camera module in the form of a folded lens including the prism 1105 and the OPFE 1110 described above. Also, the camera module 1100 may include a vertical camera module that does not include the prism 1105 and the OPFE 1110. However, example embodiments are not limited thereto.

An application processor (not shown) may be provided outside the camera module 1100. For example, the application processor (not shown) and the camera module 1100 may be provided separately as separate semiconductor chips. The application processor (not shown) may receive image data (or code values) from the camera module 1100 via an image signal line ISL. Such image data transmission may be performed using, for example, a camera serial interface (CSI) based on mobile industry processor interface (MIPI), but example embodiment are not limited thereto. The application processor (not shown) may process the received image data and generate an HDR image having improved DR. For example, the application processor (not shown) may receive image data (or code values) corresponding to images with different exposure times from the camera module 1100 and generate the HDR image by merging the image data. For convenience of description, the application processor (not shown) is described as being outside the camera module 1100, but the application processor (not shown) may be provided inside the camera module 1100.

The camera module 1100 according to the inventive concepts may transmit information about exposure times together with the code values described above to the application processor (not shown) via the image signal line ISL. For example, information about the plurality of code values respectively corresponding to images with different exposure times and information about the different exposure times for the images may be transmitted to the application processor (not shown) via the image signal line ISL. Also, the camera module 1100 may transmit, to the electronic device 20 (FIG. 1), the information about the plurality of code values respectively corresponding to images with different exposure times and the information about the different exposure times for the images. As described above, the electronic device 20 (FIG. 1) may measure the effective DR length of the camera module 1100 and the image sensor 1142, on the basis of the information about the plurality of received code values and exposure times.

The camera module 1100 according to the inventive concepts may receive information about exposure times from the electronic device 20 (FIG. 1). The camera module 1100 may capture a plurality of images taken according to the received exposure times and transmit the plurality of code values respectively corresponding to the plurality of images to the electronic device 20 (FIG. 1). The electronic device 20 (FIG. 1) according to the inventive concepts may measure the effective DR length of the camera module 1100 and the image sensor 1142 as described above, on the basis of the information about the transmitted exposure times and the plurality of code values received from the camera module 1100.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A method of operating an electronic device, the method comprising:

receiving a plurality of reference code values respectively corresponding to a plurality of reference images captured by an image sensor during different exposure times;

receiving a plurality of target code values corresponding to a target image captured by the image sensor;

estimating an inverse camera response function (CRF) by adjusting a scale of the plurality of reference code values so that the scale of the plurality of reference code values matches a scale of the inverse CRF, wherein the inverse CRF estimates radiance corresponding to the plurality of reference code values;

generating a radiance map based on the plurality of reference code values and the inverse CRF; and measuring an effective dynamic range (DR) length of the image sensor based on the radiance map and the plurality of target code values.

2. The method of claim 1, wherein the measuring of the effective DR length comprises:

generating a radiance-code function for the target image based on samples obtained by matching the plurality of target code values to the radiance map;

generating a signal-to-noise ratio code (SNR-code) function for the target image based on an average and standard deviation of adjacent code values that are adjacent to each of the plurality of target code values; and measuring the effective DR length of the image sensor based on the radiance-code function and the SNR-code function.

3. The method of claim 1, wherein the plurality of reference images comprise standard dynamic range images and the target image comprises a high dynamic range image.

4. The method of claim 1, wherein the estimating of the inverse CRF comprises adjusting the scale of the plurality of reference code values from a linear scale to a log scale.

5. The method of claim 2, wherein the generating of the SNR-code function comprises calculating the average of the adjacent code values that are adjacent to each of the plurality of target code values based on anisotropic kernels respectively corresponding to the plurality of target code values.

6. The method of claim 5, wherein the anisotropic kernels respectively corresponding to the plurality of target code values are determined based on edges in the target image respectively corresponding to the plurality of target code values.

7. The method of claim 2, wherein the target image comprises an edge region and a flat region, and wherein the generating of the SNR-code function comprises calculating the average of the adjacent code values by applying an anisotropic kernel to each of a plurality of target code values corresponding to the edge region, and calculating the average of the adjacent code values by applying an isotropic kernel to each of a plurality of target code values corresponding to the flat region.

8. The method of claim 2, wherein the generating of the SNR-code function comprises generating the SNR-code function based on the average and standard deviation of the adjacent code values corresponding to some regions of the target image.

9. The method of claim 8, wherein the some regions of the target image comprise fewer edges than other regions of the target image.

10. The method of claim 2, wherein the measuring of the effective DR length comprises measuring the effective DR length by determining, based on the SNR-code function, a lower cutoff corresponding to minimum radiance of the effective DR length and determining, based on the radiance-code function, an upper cutoff corresponding to maximum radiance of the effective DR length.

11. The method of claim 10, wherein the upper cutoff of the effective DR length is determined based on a point at which a slope of the radiance-code function is 0.

12. The method of claim 10, wherein an SNR in the SNR-code function corresponding to the lower cutoff of the effective DR length is greater than or equal to a preset threshold.

13. A method of operating an electronic device, the method comprising:

receiving a plurality of reference code values respectively corresponding to a plurality of reference images captured by an image sensor during different exposure times;

receiving a plurality of target code values corresponding to a target image captured by the image sensor;

estimating, based on the plurality of reference code values, an inverse camera response function (CRF) for estimating radiance corresponding to each of the plurality of reference code values;

generating a radiance map based on the plurality of reference code values and the inverse CRF;

determining a plurality of kernels respectively corresponding to the plurality of target code values based on an angle of gradient of an edge in the target image corresponding to each of the plurality of target code values; and measuring an effective dynamic range (DR) length of the image sensor based on the radiance map, the target code values, and the kernels, wherein at least one of the plurality of kernels includes an anisotropic kernel.

14. The method of claim 13, wherein the determining of the plurality of kernels comprises determining the plurality of kernels further based on magnitude of gradient of an edge in the target image corresponding to each of the target code values.

15. The method of claim 13, wherein the measuring of the effective DR length comprises:

generating a radiance-code function for the target image based on samples respectively obtained by matching the plurality of target code values to the radiance map;

calculating an average and standard deviation of adjacent code values that are adjacent to each of the target code values by applying the plurality of kernels respectively corresponding to the target code values;

generating a signal-to-noise ratio code (SNR-code) function for the target image based on the average and standard deviation of the adjacent code values that are adjacent to each of the target code values; and measuring the effective DR length of the image sensor based on the radiance-code function and the SNR-code function.

16. The method of claim 15, wherein the measuring of the effective DR length comprises measuring the effective DR length by determining, based on the SNR-code function, a lower cutoff of the effective DR length, and determining, based on the radiance-code function, an upper cutoff of the effective DR length.

17. The method of claim 16, wherein a lower cutoff of the effective DR length is determined based on a target code value corresponding to an SNR greater than a preset threshold in the SNR-code function and an upper cutoff of the effective DR length is determined based on radiance at which a slope of the radiance-code function is 0.

18. The method of claim 13, further comprising transmitting information about the different exposure times to the image sensor.

19. An electronic device comprising:

an inverse camera response function (CRF) estimation circuit configured to convert, into a log scale, a scale of a plurality of reference code values respectively corresponding to a plurality of reference images captured by an image sensor during different exposure times, wherein the inverse CRF estimation circuit is configured to estimate an inverse CRF based on the plurality of reference code values converted into the log scale;

a radiance map generation circuit configured to generate a radiance map based on the inverse CRF and the plurality of reference code values having the log scale;

a radiance-code function generation circuit configured to generate a radiance-code function based on the radiance map and a plurality of target code values corresponding to a target image captured by the image sensor;

a signal-to-noise ratio code (SNR-code) function generation circuit configured to generate an SNR-code function for the target image by applying an anisotropic kernel to at least one of the target code values; and an effective dynamic range (DR) length measurement circuit configured to measure an effective DR length of the image sensor based on a target code value corresponding to radiance at which a slope of the radiance-code function is 0 and a target code value corresponding to an SNR greater than or equal to a preset threshold in the SNR-code function.

20. The electronic device of claim 19, wherein the target image comprises a high dynamic range image and the plurality of reference images comprise a standard dynamic range image.

* * * * *